United States Patent
Lee et al.

(10) Patent No.: US 12,163,688 B2
(45) Date of Patent: *Dec. 10, 2024

(54) MOTOR DRIVING APPARATUS AND AIR CONDITIONER INCLUDING THE SAME

(71) Applicant: LG Electronics Inc., Seoul (KR)

(72) Inventors: Yonghwa Lee, Seoul (KR); Yongsoo Cho, Seoul (KR); Jeongeon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

This patent is subject to a terminal disclaimer.

(21) Appl. No.: 17/563,492

(22) Filed: Dec. 28, 2021

(65) Prior Publication Data
US 2022/0205673 A1 Jun. 30, 2022

(30) Foreign Application Priority Data
Dec. 28, 2020 (KR) .......................... 10-2020-0184757

(51) Int. Cl.
F24F 11/38 (2018.01)
F24F 11/88 (2018.01)
F24F 11/89 (2018.01)

(52) U.S. Cl.
CPC .............. *F24F 11/88* (2018.01); *F24F 11/38* (2018.01); *F24F 11/89* (2018.01)

(58) Field of Classification Search
CPC .......... H02P 27/06; H02P 25/18; H02P 6/085; H02P 21/14; F25B 49/025; G01R 31/34
See application file for complete search history.

(56) References Cited

U.S. PATENT DOCUMENTS

| | | | |
|---|---|---|---|
| 2009/0133419 A1* | 5/2009 | Matsuno | B60P 3/20 |
| | | | 62/239 |
| 2015/0168033 A1* | 6/2015 | Yamakawa | H02P 27/02 |
| | | | 62/324.6 |
| 2019/0245472 A1* | 8/2019 | Toyodome | H02P 6/28 |

(Continued)

FOREIGN PATENT DOCUMENTS

| | | | |
|---|---|---|---|
| JP | 2008148490 A | * | 6/2008 |
| KR | 20190040288 | | 4/2019 |

(Continued)

OTHER PUBLICATIONS

Office Action in Korean Appln. No. 10-2020-0184757, dated Apr. 22, 2022, 14 pages.

(Continued)

*Primary Examiner* — Santosh R Poudel
(74) *Attorney, Agent, or Firm* — Fish & Richardson P.C.

(57) ABSTRACT

The present disclosure relates to a motor driving apparatus and an air conditioner including the same. The motor driving apparatus and the air conditioner including the same according to an embodiment of the present disclosure include: a switching device disposed between an inverter and a motor, wherein while windings of the motor are connected in a first connection, an output current at a first level is output from the inverter, and while the windings of the motor are connected in a second connection, the output current at the first level is output from the inverter, such that it is possible to determine whether the switching device for switching connection of the motor is abnormal.

16 Claims, 24 Drawing Sheets

(56) References Cited

U.S. PATENT DOCUMENTS

| | | | | |
|---|---|---|---|---|
| 2020/0144951 A1* | 5/2020 | Nigo | ....................... | H02K 1/146 |
| 2020/0169207 A1* | 5/2020 | Kutsuki | ................... | H02P 29/00 |
| 2020/0186073 A1* | 6/2020 | Nigo | ......................... | F25B 1/00 |
| 2020/0252017 A1* | 8/2020 | Takayama | .............. | H02P 25/184 |
| 2022/0103096 A1* | 3/2022 | Shimizu | ................... | H02P 21/22 |

FOREIGN PATENT DOCUMENTS

| | | |
|---|---|---|
| WO | WO2009070089 | 6/2009 |
| WO | WO2019008756 | 1/2019 |
| WO | WO2019087243 | 5/2019 |

OTHER PUBLICATIONS

Extended European Search Report in European Appln. No. 21217429.6, dated May 25, 2022, 7 pages.

* cited by examiner (a)

(b)

|  | U-PHASE | V-PHASE | W-PHASE |
|---|---|---|---|
| Y WINDING RESISTANCE | 0.96 | 0.96 | 0.97 |
| Δ WINDING RESISTANCE | 0.41 | 0.42 | 0.42 |
| Y/Δ RATIO | 2.3 | 2.3 | 2.3 |

| | U-PHASE | V-PHASE | W-PHASE |
|---|---|---|---|
| Y WINDING RESISTANCE | 0.89 | 0.89 | 0.90 |
| Δ WINDING RESISTANCE | 1.20 | 0.47 | 0.64 |
| Y/Δ RATIO | 0.7 | 1.9 | 1.4 |

($\Delta \rightarrow Y$)

|  | U-PHASE | V-PHASE | W-PHASE |
|---|---|---|---|
| Y WINDING RESISTANCE | 0.39 | 0.41 | 0.41 |
| Δ WINDING RESISTANCE | 0.40 | 0.40 | 0.41 |
| Y/Δ RATIO | 0.98 | 1.0 | 1.0 |

(a)

(b)

MOTOR DRIVING APPARATUS AND AIR CONDITIONER INCLUDING THE SAME

CROSS-REFERENCE TO RELATED APPLICATION

This application claims the priority benefit of Korean Patent Application No. 10-2020-0184757, filed on Dec. 28, 2020, in the Korean Intellectual Property Office, the disclosure of which is incorporated herein by reference.

BACKGROUND OF THE PRESENT DISCLOSURE

1. Field of the Invention

The present disclosure relates to a motor driving apparatus and an air conditioner including the same, and more particularly to a motor driving apparatus capable of determining whether a switching device for switching connection of a motor operates abnormally, and an air conditioner including the same.

2. Description of the Related Art

An air conditioner is an apparatus that discharges cool or hot air into a room in order to adjust room temperature and to purify air in the room, thereby providing a comfortable room environment to users. Generally, the air conditioner includes an indoor device installed in the room, the indoor device including a heat exchanger, and an outdoor device for supplying refrigerant to the indoor device, the outdoor device including a compressor and a heat exchanger.

PCT Publication No. WO19-008756 (hereinafter referred to as a "prior art") discloses a switching device for switching motor windings to Y-connection and Δ-connection in order to improve power conversion efficiency or a motor driving efficiency when a compressor motor of a compressor is driven.

However, in the prior art, a mechanical switch or an electrical switch is required as the switching device in order to switch windings of the motor to Y-connection and Δ-connection, and when repeatedly used, the switch may be damaged or its life may be degraded.

SUMMARY OF THE PRESENT DISCLOSURE

It is an object of the present disclosure to provide a motor driving apparatus capable of determining whether a switching device for switching connection of a motor operates abnormally, and an air conditioner including the same.

It is another object of the present disclosure to provide a motor driving apparatus capable of determining whether a switching device operates abnormally based on a winding resistance in a first connection and a winding resistance in a second connection by an operation of the switching device, and an air conditioner including the same.

It is yet another object of the present disclosure to provide a motor driving apparatus capable of increasing power conversion efficiency or motor driving efficiency when the switching device operates normally, and an air conditioner including the same.

It is still another object of the present disclosure to provide a motor driving apparatus capable of controlling the switching device to be operated in either the first connection or the second connection when the switching device operates abnormally, and an air conditioner including the same.

It is still another object of the present disclosure to provide a motor driving apparatus capable of determining whether a failure occurs in the motor, and an air conditioner including the same.

In accordance with an aspect of the present disclosure, the above and other objects can be accomplished by providing a motor driving apparatus and an air conditioner including the same, which include: an inverter having a plurality of switching elements, and configured to output alternating current (AC) power to a motor based on a switching operation; a switching device disposed between the inverter and the motor, and configured to switch windings of the motor to a first connection or a second connection; an output current detector configured to detect an output current output from the inverter; and a controller configured to control the inverter and the switching device, wherein in a switching device check mode, an output current at a first level is output from the inverter during a first period in a state in which the windings of the motor are connected in the first connection by an operation of the switching device, and the output current at the first level is output from the inverter during a second period after the first period in a state in which the windings of the motor are connected in the second connection by the operation of the switching device.

Meanwhile, based on a winding resistance of the motor in the first connection and a winding resistance of the motor in the second connection, the controller may determine whether the switching device operates abnormally.

Meanwhile, the motor driving apparatus and the air conditioner including the same may further include an output voltage detector configured to detect an output voltage output from the inverter, wherein the controller may calculate a first winding resistance of the motor based on a first output voltage detected according to an output of the output current at the first level during the first period; may calculate a second winding resistance of the motor based on a second output voltage detected according to the output of the output current at the first level during the second period; and may determine whether the switching device operates abnormally based on the first winding resistance and the second winding resistance.

Meanwhile, the controller may calculate a ratio between the first winding resistance and the second winding resistance and may determine whether the switching device operates abnormally based on the calculated ratio.

Meanwhile, the controller may calculate ratios between the first winding resistance and the second winding resistance for each phase; and in response to ratios of all phases among the calculated ratios being within a predetermined range, the controller may determine that the switching device is normal, and may control the switching device to switch the windings of the motor from the first connection to the second connection according to an operating frequency of the motor.

Meanwhile, the controller may control the motor to continue to operate without stopping while the switching device switches the windings of the motor from the first connection to the second connection.

Meanwhile, the controller may control the operating frequency of the motor to decrease from a first frequency to a second frequency and then to increase again, while the switching device switches the windings of the motor from the first connection to the second connection.

Meanwhile, the controller may calculate ratios between the first winding resistance and the second winding resistance for each phase; and in response to a ratio of at least one phase among the calculated ratios falling outside a predetermined range, the controller may determine that the switching device is abnormal, and may control the windings of the motor to be operated in either the first connection or the second connection.

Meanwhile, the controller may calculate the first winding resistance and the second winding resistance for each phase; and in response to a range of the first winding resistance for each phase falling outside a first range, and a range of the second winding resistance for each phase falling outside a second range, the controller may determine that the motor is out of order.

Meanwhile, the controller may calculate the first winding resistance and the second winding resistance for each phase; and in response to a range of the first winding resistance for each phase being within the first range, and a range of the second winding resistance for each phase being within the second range, the controller may determine that the switching device is normal, and may control the switching device to switch the windings of the motor from the first connection to the second connection according to an operating frequency of the motor.

Meanwhile, the controller may calculate the first winding resistance and the second winding resistance for each phase; and in response to a range of the first winding resistance for each phase being within the first range, and a range of the second winding resistance for each phase falling outside the second range, the controller may determine that the switching device is abnormal, and may control the windings of the motor to be operated only in the first connection.

Meanwhile, the controller may calculate the first winding resistance and the second winding resistance for each phase; and in response to a range of the first winding resistance for each phase falling outside the first range, and a range of the second winding resistance for each phase being within the second range, the controller may determine that the switching device is abnormal, and may control the windings of the motor to be operated only in the second connection.

Meanwhile, the controller may control the output current at the first level and the output current at the second level to be sequentially output from the inverter during the first period in a state in which the windings of the motor are connected in the first connection; and may control the output current at the first level and the output current at the second level to be sequentially output from the inverter during the second period in a state in which the windings of the motor are connected in the second connection.

Meanwhile, the motor driving apparatus and the air conditioner including the same may further include an output voltage detector configured to detect an output voltage output from the inverter, wherein the controller may calculate a first winding resistance of the motor based on an output voltage detected according to the output of the output current at the first level and the output current at the second level during the first period; may calculate a second winding resistance of the motor based on a second output voltage detected according to the output of the output current at the first level and the output current at the second level during the second period; and may determine whether the switching device operates abnormally based on the first winding resistance and the second winding resistance.

Meanwhile, the motor may be a three-phase motor; and the switching device may include a first to third relays which are electrically connected to each phase output of the inverter, wherein: a first terminal of the first relay, a first terminal of the second relay, and a first terminal of the third relay may be connected in parallel; one end of a first winding of the motor may be connected to a second terminal of the first relay; one end of a second winding of the motor may be connected to a second terminal of the second relay; one end of a third winding of the motor may be connected to a second terminal of the third relay; an opposite end of the first winding of the motor may be connected to a common terminal of the third relay; an opposite end of the second winding of the motor may be connected to a common terminal of the first relay; and an opposite end of the third winding of the motor may be connected to a common terminal of the second relay.

Meanwhile, for the first connection, the controller may control the common terminals of the first to third relays to be electrically connected to the respective first terminals of the first to third relays; and for the second connection, the controller may control the common terminals of the first to third relays to be electrically connected to the respective second terminals of the first to third relays.

In accordance with another aspect of the present disclosure, the above and other objects can be accomplished by providing a motor driving apparatus and an air conditioner including the same, which include: an inverter having a plurality of switching elements, and configured to output alternating current (AC) power to a motor based on a switching operation; a switching device disposed between the inverter and the motor, and configured to switch windings of the motor to a first connection or a second connection; an output current detector configured to detect an output current output from the inverter; and a controller configured to control the inverter and the switching device, wherein based on a first winding resistance of the motor in the first connection and a second winding resistance of the motor in the second connection, the controller determines whether the switching device operates abnormally.

Meanwhile, the controller may calculate the first winding resistance and the second winding resistance for each phase, wherein: in response to a range of the first winding resistance for each phase falling outside a first range, and a range of the second winding resistance for each phase falling outside a second range, the controller may determine that the motor is out of order: and in response to a range of the first winding resistance for each phase being within the first range, and a range of the second winding resistance for each phase being within the second range, the controller may determine that the switching device is normal, and may control the switching device to switch the windings of the motor from the first connection to the second connection according to an operating frequency of the motor.

Meanwhile, the controller may calculate the first winding resistance and the second winding resistance for each phase, wherein: in response to a range of the first winding resistance for each phase being within a first range, and a range of the second winding resistance for each phase falling outside a second range, the controller may determine that the switching device is abnormal and may control the windings of the motor to be operated only in the first connection: and in response to a range of the first winding resistance for each phase falling outside the first range, and a range of the second winding resistance for each phase being within the second range, the controller may determine that the switching device is abnormal, and may control the windings of the motor to be operated only in the second connection.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Exemplary embodiments of the present disclosure will be described with reference to the accompanying drawings.

The terms "module" and "unit," when attached to the names of components are used herein to help the understanding of the components and thus they should not be considered as having specific meanings or roles. Accordingly, the terms "module" and "unit" may be used interchangeably.

Figure 1:
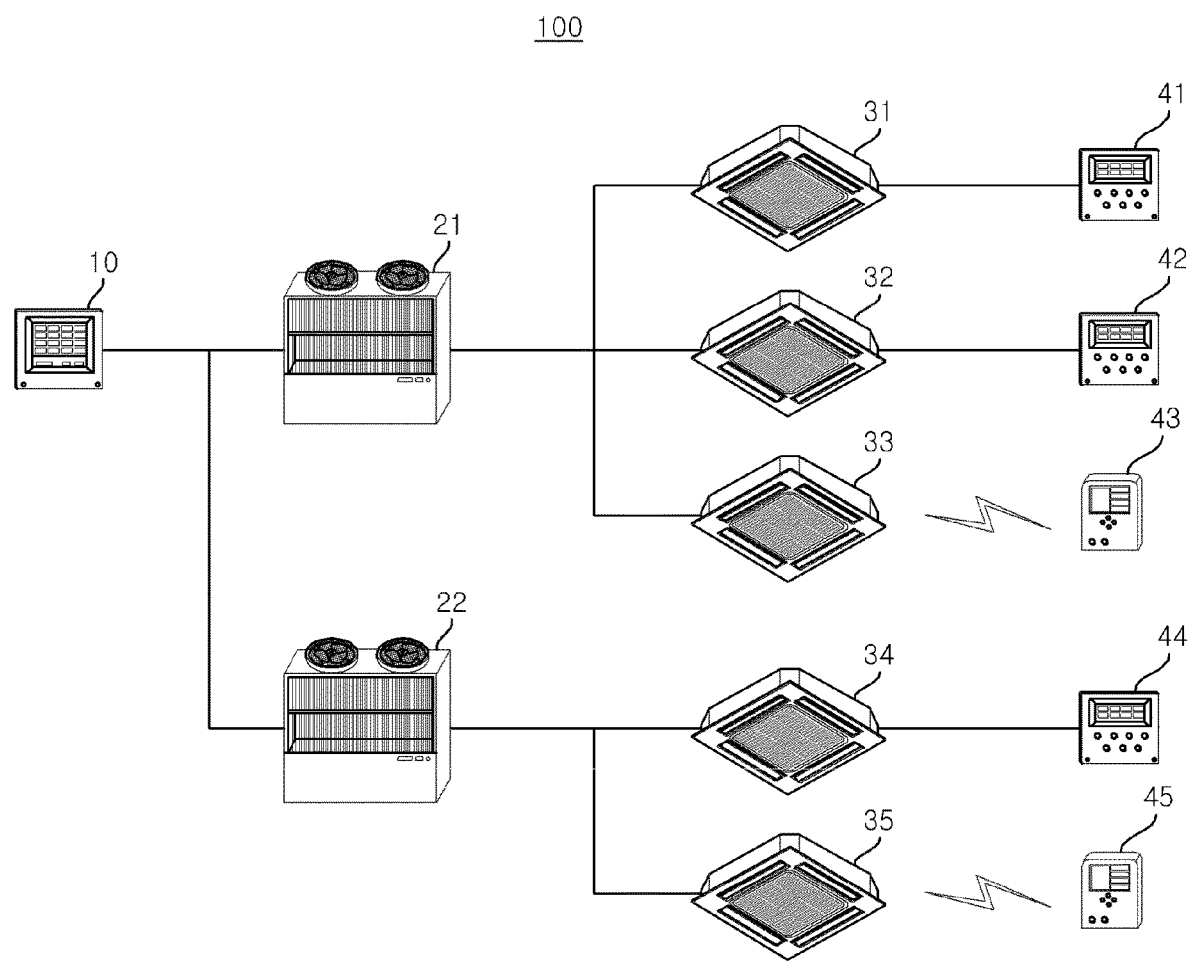
FIG. 1 is a view showing the construction of an air conditioner according to an embodiment of the present disclosure.

FIG. 1 is a view showing the construction of an air conditioner according to an embodiment of the present disclosure.

As illustrated in FIG. 1, the air conditioner according to the embodiment of the present disclosure is a large-sized air conditioner 100, and may include a plurality of indoor devices 31 to 35, a plurality of outdoor devices 21 and 22 connected to the plurality of indoor devices 31 to 35, a plurality of remote controls 41 to 45 connected to the respective indoor devices, and a remote controller 10 for controlling the plurality of indoor devices and outdoor devices.

The remote controller 10 may be connected to the plurality of indoor devices 31 to 36 and the plurality of outdoor devices 21 and 22 to monitor and control operations thereof. In this case, the remote controller 10 may be connected to the plurality of indoor devices to perform operation setting, locking setting, schedule control, group control, and the like.

Any one of a stand type air conditioner, a wall mount type air conditioner, and a ceiling type air conditioner may be used as the air conditioner 100, but a ceiling type air conditioner will be described below by way of example, for the convenience of description.

In addition, the air conditioner may further include at least one of a ventilator, an air purifier, a humidifier, and a heater, which may be operated in response to the operations of the indoor devices and the outdoor devices.

The outdoor devices 21 and 22 may include a compressor (not shown) for receiving and compressing a refrigerant, an outdoor heat exchanger (not shown) for heat exchange between the refrigerant and outside air, an accumulator (not shown) for extracting a gaseous refrigerant from the received refrigerant and supplying the refrigerant to the compressor, and a four-way valve (not shown) for selecting a refrigerant passage for a heating operation. In addition, the outdoor devices 21 and 22 may further include a plurality of sensors, valves, an oil recovery unit, etc., but a description thereof will be omitted below.

The outdoor devices 21 and 22 operate the compressor and the outdoor heat exchanger included therein, to compress or heat exchange the refrigerant according to a setting, and supply the refrigerant to the indoor devices 31 to 35. The outdoor devices 21 and 22 are driven by a request from the remote controller 10 or the indoor devices 31 to 35, and a cooling/heating capacity changes according to the driven outdoor devices, such that a number of operating outdoor devices and a number of operating compressors installed in the outdoor devices may change.

In this case, the following description will be made based on an example in which the plurality of outdoor devices 21 and 22 respectively supply the refrigerant to each of the indoor devices connected thereto, but depending on a connection structure of the outdoor devices and the indoor devices, the plurality of outdoor devices may be connected to each other to supply the refrigerant to the plurality of indoor devices.

The indoor devices 31 to 35 may be connected to any one of the plurality of outdoor devices 21 and 22, to be supplied with the refrigerant and to discharge cool or hot air into a room. The indoor devices 31 to 35 include an indoor heat exchanger (not shown), an indoor fan (not shown), an expansion valve (not shown) in which the supplied refrigerant is expanded, and a plurality of sensors (not shown).

In this case, the outdoor devices 21 and 22 and the indoor devices 31 to 35 may be connected to each other via a communication line to transmit and receive data therebetween, and the outdoor devices 21 and 22 and the indoor devices 31 to 35 may be connected to the remote controller 10 via another communication line to operate under the control of the remote controller 10.

The remote controls 41 to 45, which are connected to the respective indoor devices, may transmit a user's control command to the indoor devices, and may receive and display information about the state of the indoor devices. In this case, the remote controls communicate by wire or wirelessly with the indoor devices depending on the manner in which the input devices are connected to the indoor devices, and in some cases a single remote control may be connected to the plurality of indoor devices such that settings of the plurality of indoor devices may be changed by the input of the single remote control.

In addition, each of the remote controls 41 to 45 may include a temperature sensor provided therein.

Figure 2:
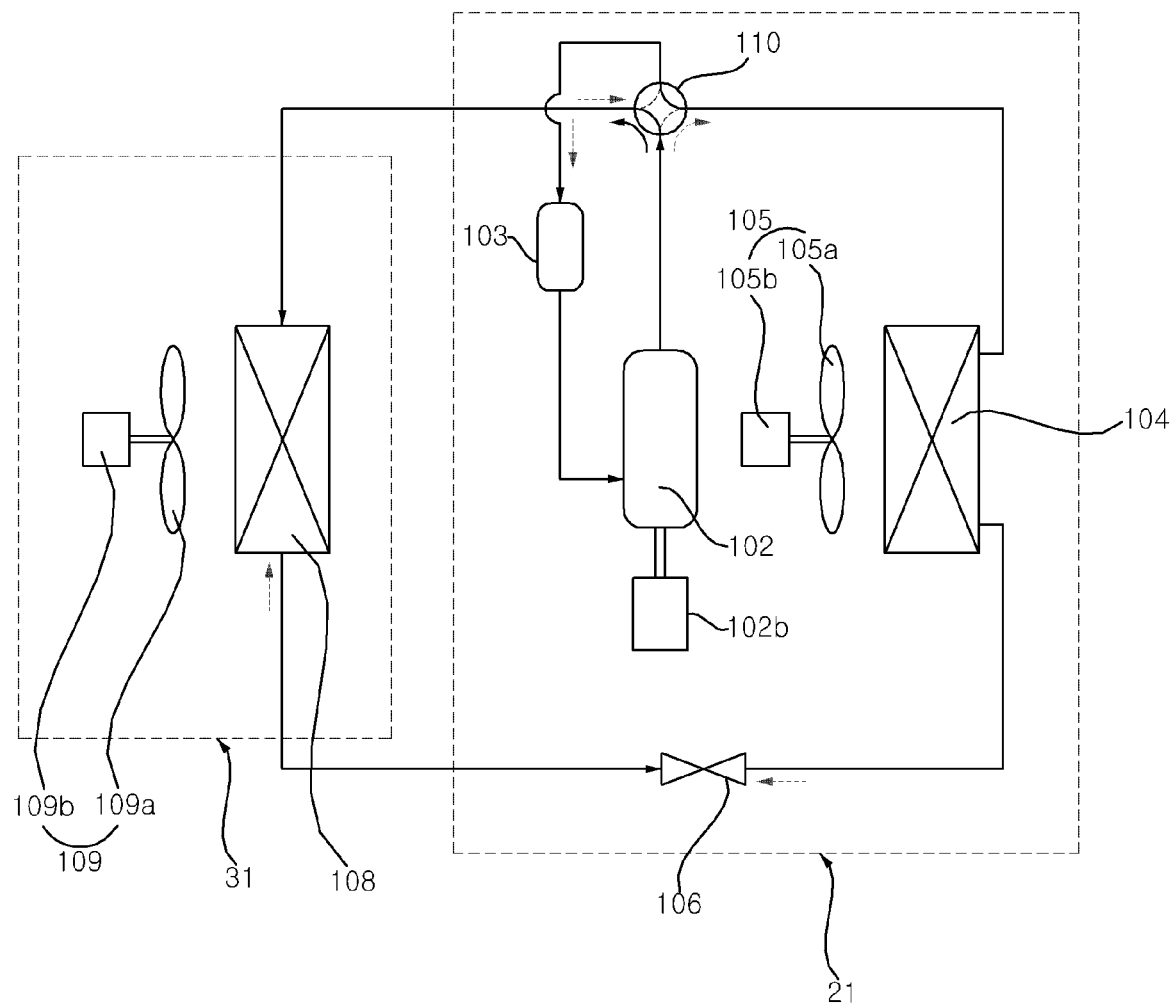
FIG. 2 is a schematic view showing an outdoor device and an indoor device of FIG. 1.

FIG. 2 is a schematic view showing an outdoor device and an indoor device of FIG. 1.

Referring to the drawing, the air conditioner 100 is basically divided into an indoor device 31 and an outdoor device 21.

The outdoor device 21 includes a compressor 102 for compressing refrigerant, a compressor motor 102b for driving the compressor, an outdoor heat exchanger 104 for cooling the compressed refrigerant, an outdoor blower 105 including an outdoor fan 105a disposed at one side of the outdoor heat exchanger 104 for accelerating the cooling of the refrigerant and a motor 105b for rotating the outdoor fan 105a, an expansion device 106 for expanding the condensed refrigerant, a cooling/heating switch valve 110 for changing the path of the compressed refrigerant, and an accumulator 103 for temporarily storing the gaseous refrigerant, removing moisture and foreign matter from the refrigerant, and supplying the refrigerant to the compressor under a predetermined pressure.

An indoor device 31 includes an indoor heat exchanger 108 disposed in a room for performing cooling/heating and an indoor blower 109 including an indoor fan 109a disposed at one side of the indoor heat exchanger 108 for accelerating the cooling of the refrigerant and a motor 109b for rotating the indoor fan 109a.

At least one indoor heat exchanger 108 may be installed. An inverter compressor or a fixed speed compressor may be used as the compressor 102.

In addition, the air conditioner 100 may be configured as a cooler for cooling a room or as a heat pump for cooling or heating a room.

A single indoor device 30a and a single outdoor device 20 are shown in FIG. 2. However, the present disclosure is not limited thereto. The present disclosure may also be applied to a multi-type air conditioner including a plurality of indoor devices and a plurality of outdoor devices or an air conditioner including a single indoor device and a plurality of outdoor devices.

The compressor 102 in the outdoor device 21 may be driven by a motor driving apparatus 220 for compressor driving, which drives a compressor motor 230.

Figure 3:
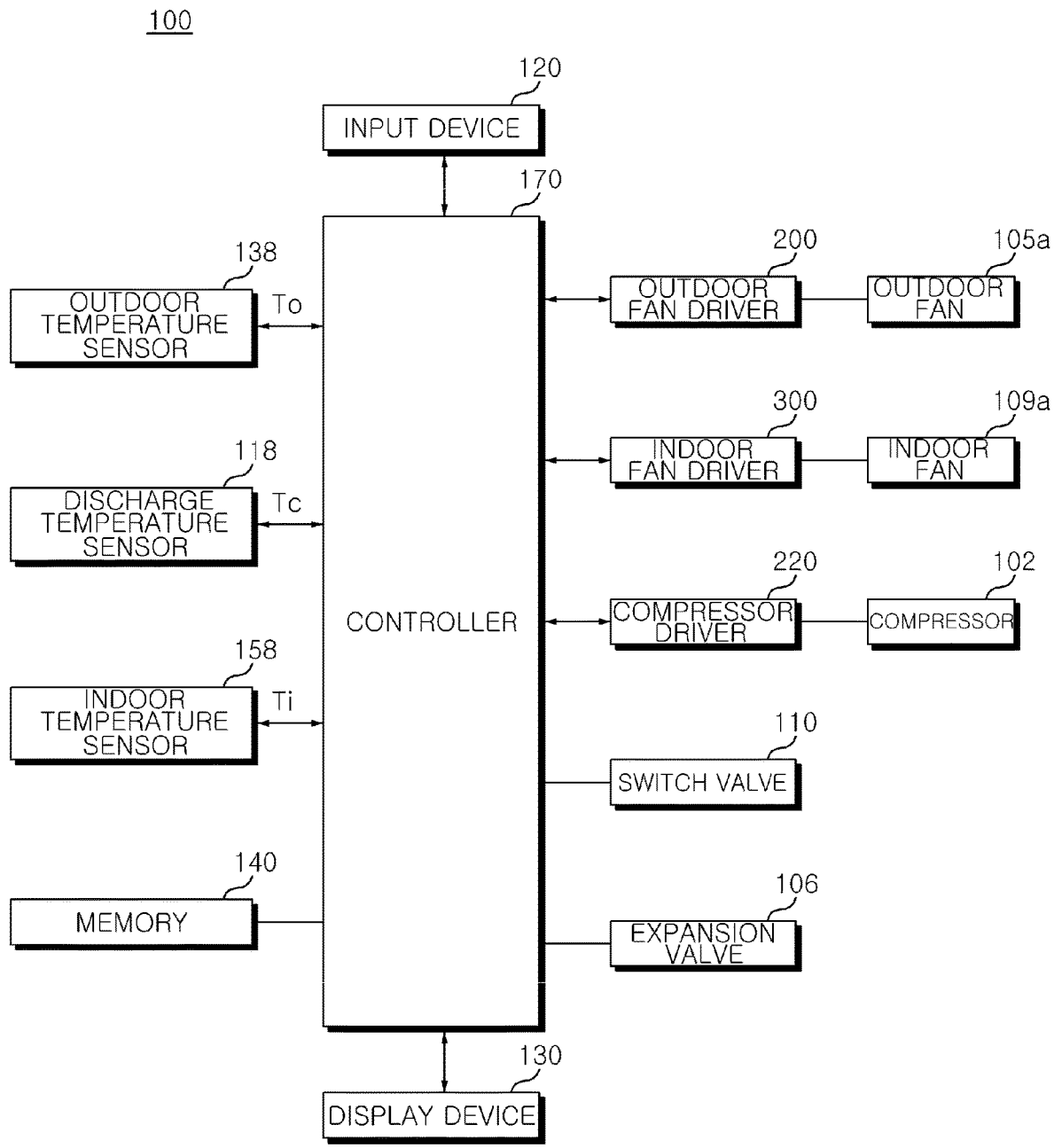
FIG. 3 is an internal block diagram schematically illustrating the air conditioner of FIG. 1.

FIG. 3 is an internal block diagram schematically illustrating the air conditioner of FIG. 1.

Referring to the drawing, the air conditioner 100 of FIG. 3 includes the compressor 102, an outdoor fan 105a, an indoor fan 109a, a controller 170, a discharge temperature sensor 118, an outdoor temperature sensor 138, an indoor temperature sensor 158, and a memory 140.

In addition, the air conditioner 100 may further include a compressor driver 220, an outdoor fan driver 200, an indoor fan driver 300, a switch valve 110, an expansion valve 106, a display device 130, and an input device 120.

The compressor 102, the outdoor fan 105a, and the indoor fan 109a are described above with reference to FIG. 2.

The input device 120 has a plurality of operation buttons, and transmits a signal for an operating target temperature of the air conditioner 100 to the controller 170.

The display device 130 may display an operating state of the air conditioner 100.

The memory 140 may store data required for the operation of the air conditioner 100.

The discharge temperature sensor 118 may sense refrigerant discharge temperature Tc at the compressor 102, and may transmit a signal for the sensed refrigerant discharge temperature Tc to the controller 170.

The outdoor temperature sensor 138 may sense outdoor temperature To, which is ambient temperature around the outdoor device 21 of the air conditioner 100, and may transmit a signal for the sensed outdoor temperature To to the controller 170.

The indoor temperature sensor 158 may sense indoor temperature Ti, which is ambient temperature around the indoor device 31 of the air conditioner 100, and may transmit a signal for the sensed indoor temperature Ti to the controller 170.

The controller 170 may control the air conditioner 100 to operate based on at least one of the sensed refrigerant discharge temperature Tc, the sensed outdoor temperature To, and the sensed indoor temperature Ti, and the input target temperature. For example, the controller 170 may control the air conditioner 100 to operate by calculating a final target superheat degree.

Further, in order to control operations of the compressor 102, the indoor fan 109a, and the outdoor fan 105a, the controller 170 may control the compressor driver 220, the outdoor fan driver 200, and the indoor fan driver 300, respectively, as illustrated herein.

For example, the controller 170 may output a corresponding speed reference signal to the compressor driver 220, the outdoor fan driver 200, or the indoor fan driver 300 based on the target temperature.

Further, based on each speed reference signal, the compressor motor (not shown), the motor 230, the indoor fan motor 109b may operate at each target rotation speed.

The controller 170 may control the overall operation of the air conditioner 100, in addition to the control of the compressor driver 220, the outdoor fan driver 200, or the indoor fan driver 300.

For example, the controller 170 may control the operation of the cooling/heating switch valve 110 or a four-way valve.

Alternatively, the controller 170 may control the operation of expansion equipment or the expansion valve 106.

Figure 4:
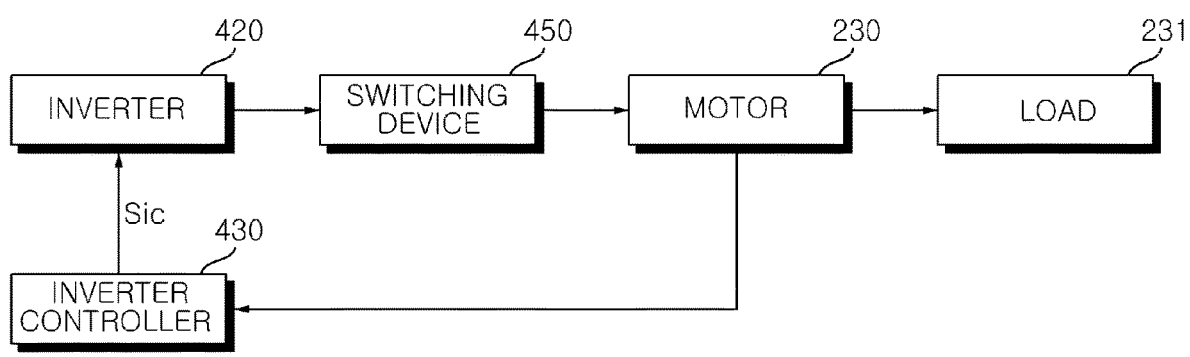
FIG. 4 is an internal block diagram illustrating a motor driving apparatus according to an embodiment of the present disclosure.
Figure 5:
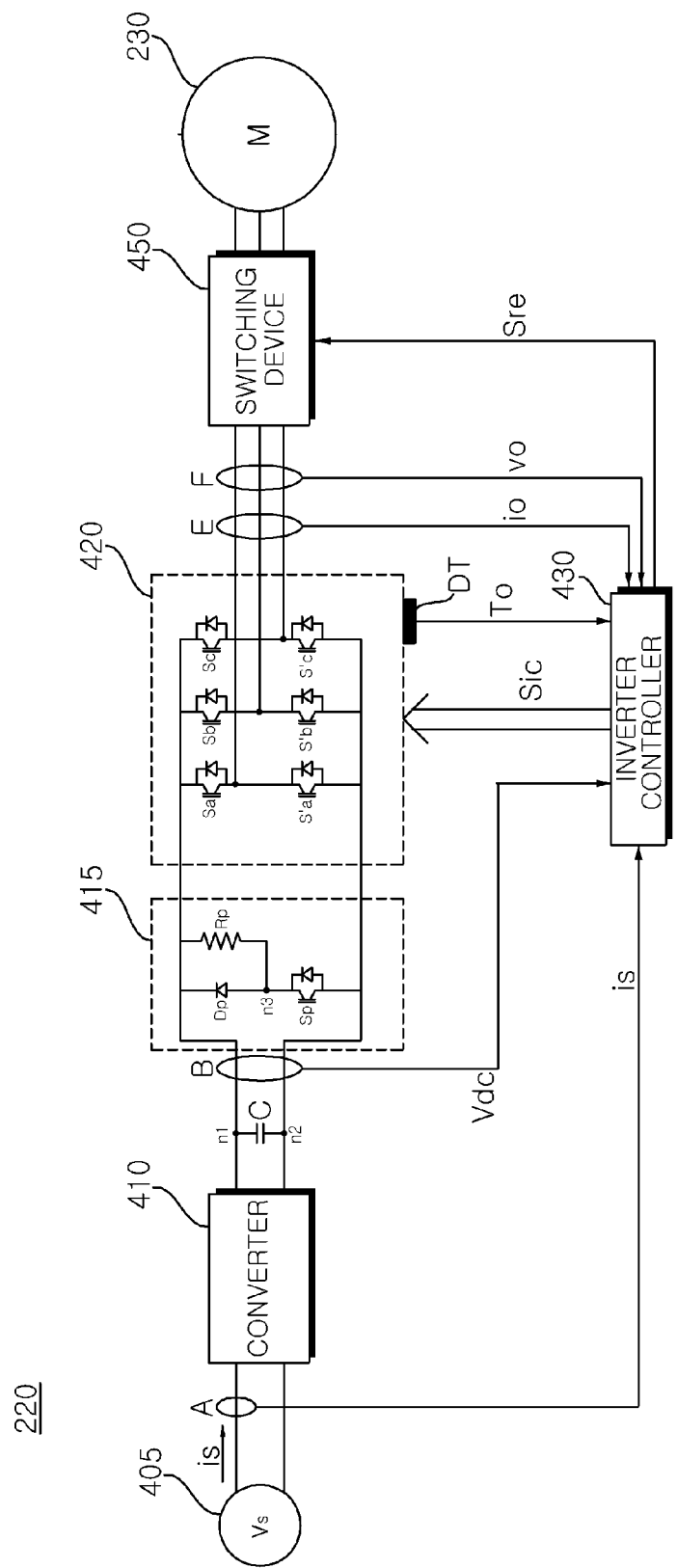
FIG. 5 is an internal circuit diagram illustrating the motor driving apparatus of FIG. 4.

FIG. 4 is an internal block diagram illustrating a motor driving apparatus according to an embodiment of the present disclosure; and FIG. 5 is an internal circuit diagram illustrating the motor driving apparatus of FIG. 4.

Referring to the drawings, the motor driving apparatus 220 according to an embodiment of the present disclosure is used for driving a motor in a sensorless mode, and may be referred to as a power conversion device.

The motor driving apparatus 220 according to the embodiment of the present disclosure may include a converter 410, an inverter 420, an inverter controller 430, a switching device 450, a DC terminal voltage detector B, a DC terminal capacitor C, an output current detector E, and an output voltage detector F. In addition, the motor driving apparatus 220 may further include an input current detector A and the like.

The input current detector A may detect an input current $i_s$ input from a commercial AC power source 405. To this end, a current transformer (CT), shunt resistor and the like may be used as the input current detector A. The detected input current $i_s$, which is a pulse type discrete signal, may be input to the inverter controller 430.

The converter 410 converts a voltage, having output from the commercial AC power source 405 and passed through the reactor L, into a DC voltage, and outputs the DC voltage. While the commercial AC power source 405 is shown as a three-phase AC power source, the commercial AC power may also be a single-phase AC power source. The internal structure of the converter 410 may change according to the type of the commercial AC power source 405.

The converter 410 may include diodes without a switching element, such that the converter 410 may perform a rectification operation without performing a separate switching operation.

For example, six diodes may be arranged in the form of a bridge for the three-phase AC power source, and four diodes may be arranged in the form of a bridge for the single-phase AC power source.

The converter 410 may include six switching elements and six diodes for the three-phase AC power source, and in the case of single-phase AC power, a half-bridge type converter having two switching elements and four diodes may be used as the converter 410.

When the converter 410 is provided with switching elements, the converter 410 may perform voltage boosting, power factor improvement, and DC voltage conversion according to a switching operation of the switching element.

The DC terminal capacitor C is disposed at the DC terminal, and stores the voltage output from the converter 410. In the drawing, a single device is exemplified as the dc terminal capacitor C, but a plurality of devices may be provided to ensure device stability.

Further, while it is illustrated that the DC terminal capacitor C is connected to the output terminal of the converter 410, the present disclosure is not limited thereto, and a DC voltage may be directly input to the DC terminal capacitor C.

For example, a DC voltage from a solar cell may be directly input to the DC terminal capacitor C or may be DC/DC converted and then input to the DC terminal capacitor C. The following description will be based on parts illustrated in the figure.

Both terminals n1-n2 of the DC terminal capacitor may be referred to as DC terminals or DC link terminals since DC voltage is stored in the DC terminal capacitor.

The dc terminal voltage detector B may detect a voltage Vdc applied between both terminals of the DC terminal capacitor C. To this end, the DC terminal voltage detector B may include a resistor, an amplifier, and the like. The detected DC terminal voltage Vdc, which is a pulse type discrete signal, may be input to the controller 430.

The inverter 420 may include a plurality of inverter switching elements Sa~Sc and S'a~S'c, and may convert the DC voltage Vdc at the DC terminal into three-phase AC voltages Va, Vb, and Vc according to on/off operations of the switching elements Sa~Sc and S'a~S'c and output the voltages to the three-phase synchronous motor 250.

In the inverter 420, the upper arm switching element Sa, Sb, Sc and the lower arm switching element S'a, S'b, and S'c which are connected in series with each other form a pair, and a total of three pairs of upper and lower arm switching elements are connected in parallel with each other Sa&S'a, Sb&S'b, and Sc&S'c. Diodes are connected in reverse parallel to each of the switching elements Sa, S'a, Sb, S'b, Sc, and S'c.

The switching elements in the inverter 420 are turned on/off based on the inverter switching control signal Sic from the inverter controller 430. Thus, the three-phase AC voltages of predetermined frequencies are output to the three-phase synchronous motor 230.

The inverter controller 430 may control the switching operation of the inverter 420 in a sensorless mode. To this end, the inverter controller 430 may receive an output current io detected by the output current detector E.

In order to control the switching operation of the inverter 420, the inverter controller 430 may output an inverter switching control signal Sic to the inverter 420. The inverter switching control signal Sic is a pulse width modulation (PWM)-based switching control signal, and is generated based on the output current io detected by the output current detector E and the generated signal is output. An operation of outputting the inverter switching control signal Sic in the inverter controller 430 will be descried in detail later with reference to FIG. 6.

The output current detector E detects the output current io flowing between the inverter 420 and the three-phase motor 230. That is, the output current detector E detects a current flowing through the motor 230. The output current detector E may detect all three phase output currents ia, ib, and ic, or may detect two phase output currents using three phase equilibrium.

The output current detector E may be disposed between the inverter 420 and the motor 230, and may use a current transformer (CT), a shunt resistor, and so on for current detection.

When the shunt resistor is used, three shunt resistors may be disposed between the inverter 420 and the synchronous motor 230, or one end thereof may be connected to the respective three lower arm switching element S'a, S'b, and S'c of the inverter 420.

Further, two shunt resistors may also be used based on three phase equilibrium. In the case where one shunt resistor is used, the shunt resistor may be disposed between the capacitor C and the inverter 420.

The detected output current io, which is a pulse type discrete signal, may be applied to the inverter controller 430, and the inverter switching control signal Sic may be generated based on the detected output current io. In the following description, the detected output current io may correspond to three-phase output currents ia, ib, and ic.

The output voltage detector F may detect an output voltage vo output from the inverter 420. Specifically, the output voltage detector F may detect each phase output voltage vo output from the inverter. To this end, the output voltage detector F may include a resistor, an amplifier, and the like. The detected output voltage vo, as a pulse type discrete signal, may be input to the inverter controller 430.

The three-phase motor 230 includes a stator and a rotor. All three phase AC voltages of predetermined frequencies are applied to coils of all three phase (a-phase, b-phase, and c-phase) stators to rotate the rotor.

For example, the motor 230 can include a surface-mounted permanent-magnet synchronous motor (SMPMSM), an interior permanent magnet synchronous motor (IPMSM), a synchronous reluctance motor (Synrm) and the like. The SMPMSM and IPMSM are permanent magnet synchronous motors (PMSMs) employing a permanent magnet and the Synrm has no permanent magnet.

Further, the switching device 450 is disposed between the inverter 420 and the motor 230, and may switch windings of the motor 230 to a first connection or a second connection.

Here, the first connection may be Y-connection, and the second connection may be Δ-connection.

To this end, the switching device 450 may include three relays SW1 to SW3 respectively connected between three-phase output terminals of the inverter 420 and three-phase coils CA, Cb, and CC.

That is, the switching device 450 may include first to third relays SW1 to SW3 which are electrically connected to the respective phase outputs.

If the motor 230 operates at a speed less than or equal to a first speed or a first operating frequency, the switching device 450 may operate for the motor 230 to be in the first connection; and if the motor 230 operates at a speed exceeding the first speed or the first operating frequency, the switching device 450 may operate for the motor 230 to be in the second connection, thereby increasing the power conversion efficiency or motor driving efficiency.

Particularly, at a low speed less than or equal to the first speed or the first operating frequency, the power conversion efficiency or motor driving efficiency may be improved.

Meanwhile, the motor driving device 220 according to an embodiment of the present disclosure includes: an inverter 420 having a plurality of switching elements Sa~Sc and S'a~S'c, and configured to output alternating current (AC) power to a motor based on a switching operation; a switching device 450 disposed between the inverter 420 and the motor 230, and configured to switch windings of the motor 230 to a first connection or a second connection; an output current detector E configured to detect an output current io output from the inverter 420; and a controller 170 or an inverter controller 430 configured to control the inverter 420 and the switching device 450, in which in a switching device check mode for inspecting the switching device 450, the output current io at a first level Lvn1 is output from the inverter 420 during a first period Pn1 while the windings of the motor 230 are connected in a first connection by an operation of the switching device 450; and the output current io at the first level Lvn1 is output from the inverter 420 during a second period Pn2 after the first period Pn1 while the windings of the motor 230 are connected in a second connection by the operation of the switching device 450. Accordingly, it is possible to determine an abnormal operation of the switching device 450 for switching the connection of the motor 230. A detailed description thereof will be given later with reference to FIG. 7 and the following figures.

Figure 6:
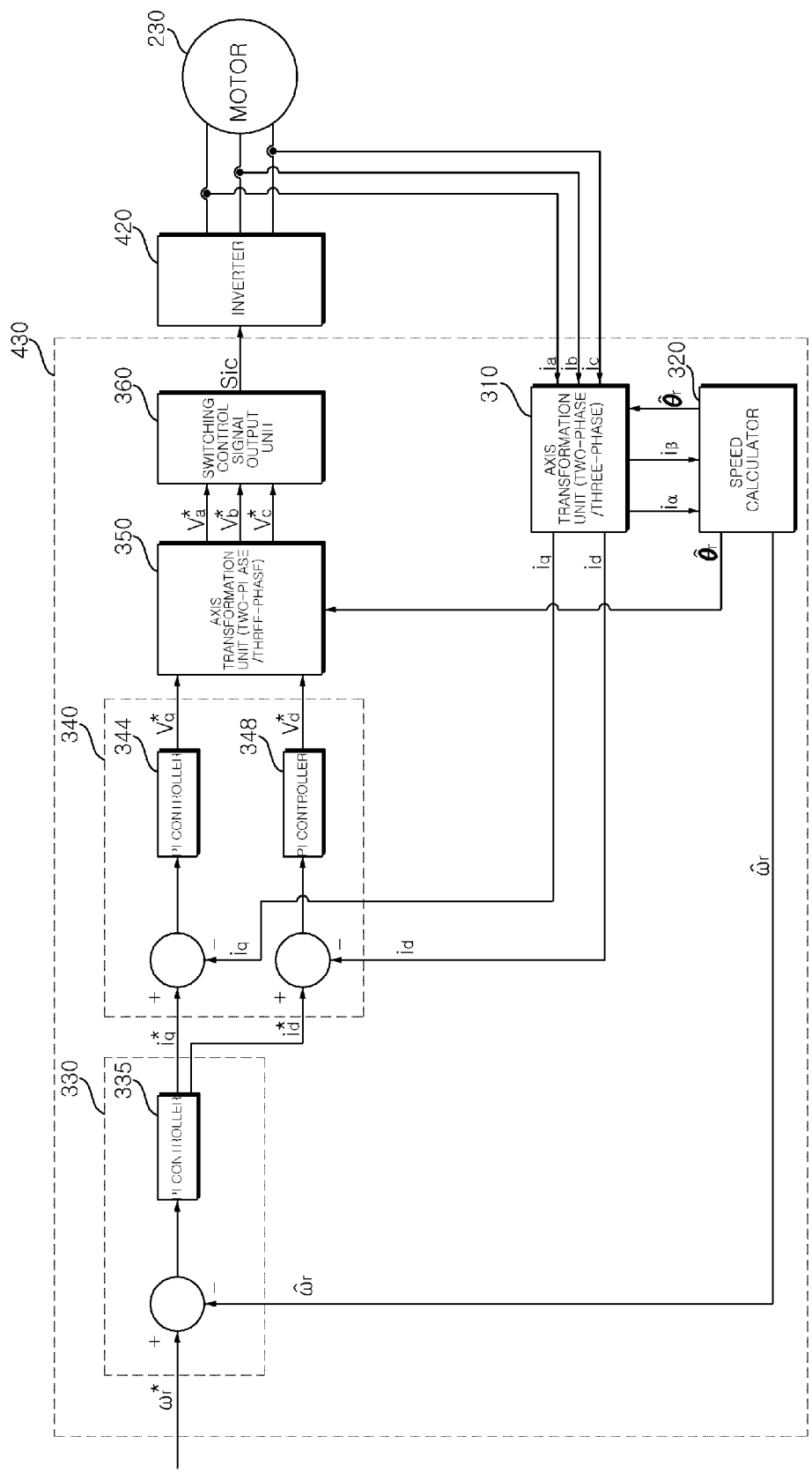
FIG. 6 is an internal block diagram illustrating an inverter controller of FIG. 5.

FIG. 6 is an internal block diagram illustrating an inverter controller of FIG. 5.

Referring to FIG. 6, the inverter controller 430 may include an axis transformation unit 310, a speed calculator 320, a current reference generator 330, a voltage reference generator 340, an axis transformation unit 350, and a switching control signal output unit 360.

The axis transformation unit 310 receives the three-phase output currents $i_a$, $i_b$, and $i_c$ detected by the output current detector E and transforms the received output currents $i_a$, $i_b$, and $i_c$ into two-phase currents $i_\alpha$ and $i_\beta$ of a stationary coordinate system.

Meanwhile, the axis transformation unit 310 may transform the two-phase currents $i_\alpha$ and $i_\beta$ of the stationary coordinate system into two-phase currents $i_d$ and $i_q$ of a rotating coordinate system.

The speed calculator 320 may output a calculated position $\hat{\theta}_r$ and a calculated speed $\hat{\omega}_r$ based on the two-phase currents $i_\alpha$ and $i_\beta$ of the stationary coordinate system which is transformed by the axis transformation unit 310.

Meanwhile, the current reference generator 530 generates a current reference value $i^*_q$ based on the calculated speed $\hat{\omega}_r$ and a speed reference value $\omega^*_r$. For example, a PI controller 335 of the current reference generator 330 may perform PI control based on a difference between the calculated speed $\hat{\omega}_r$ and the speed reference value $\omega^*_r$, and may generate a current reference value $i^*_q$. Although a q-axis current reference value $i^*_q$ is shown as the current reference value in the figure, it is possible to generate a d-axis current reference value $i^*_d$ together with the q-axis current reference value $i^*_q$. The d-axis current reference value $i^*_d$ may be set to 0.

Meanwhile, the current reference generator 330 may further include a limiter (not shown) for limiting the level of the current reference value $i^*_q$ such that the current reference value $i^*_q$ does not exceed an allowable range.

The voltage reference generator 340 generates d-axis and q-axis voltage reference values $V^*_d$ and $V^*_q$ based on d-axis and q-axis currents $i_d$ and $i_q$ axis-transformed into a two-phase rotating coordinate system by the axis transformation unit and the current reference value $i^*_d$ and $i^*_q$ generated by the current reference generator 330. For example, a PI controller 344 of the voltage reference generator 340 may perform PI control based on the difference between the q-axis current $i_q$ and the q-axis current reference value $i^*_q$ to generate a q-axis voltage reference value $V^*_q$. In addition, a PI controller 348 of the voltage reference generator 340 may perform PI control based on the difference between the d-axis current $i_d$ and the d-axis current reference value $i^*_d$ to generate a d-axis voltage reference value $V^*_d$. Meanwhile, the voltage reference generator 340 may further include a limiter (not shown) for limiting levels of the d-axis and q-axis voltage reference values $V^*_d$ and $V^*_q$ such that the d-axis and q-axis voltage reference values $V^*_d$ and $V^*_q$ do not exceed allowable ranges.

Meanwhile, the generated d-axis and q-axis voltage reference values $V^*_d$ and $V^*_q$ are input to the axis transformation unit 350.

The axis transformation unit 350 receives the calculated position $\hat{\theta}_r$ and the d-axis and q-axis voltage reference values $V^*_d$ and $V^*_q$ from the position estimator 320 to perform axis transformation.

First, the axis transformation unit 350 performs transformation from a two-phase rotating coordinate system to a two-phase stationary coordinate system. At this time, the position $\hat{\theta}_r$ calculated by the position estimator 320 may be used.

Subsequently, the axis transformation unit 350 performs transformation from the two-phase stationary coordinate system to a three-phase stationary coordinate system. As a result, the axis transformation unit 350 outputs three-phase output voltage reference values V*a, V*b, and V*c.

The switching control signal output unit 360 generates and outputs a PWM-based inverter switching control signal $S_{ic}$ based on the three-phase output voltage reference values V*a, V*b, and V*c.

The output inverter switching control signal $S_{ic}$ may be converted into a gate driving signal by a gate driver (not shown), and may then be input to a gate of each switching element of the inverter 420. As a result, the respective switching elements Sa, S'a, Sb, S'b, Sc, and S'c of the inverter 420 perform switching operations.

As described above, it is essential for the motor driving apparatus 220 to sense an output current io flowing to the motor, particularly a phase current, in order to perform vector control for driving the motor 230 through control of the inverter 420.

The inverter controller 430 may control the motor 230 to produce a desired speed and a desired torque using the current command generator 330 and the voltage command generator 340 based on the sensed phase current.

Figure 7:
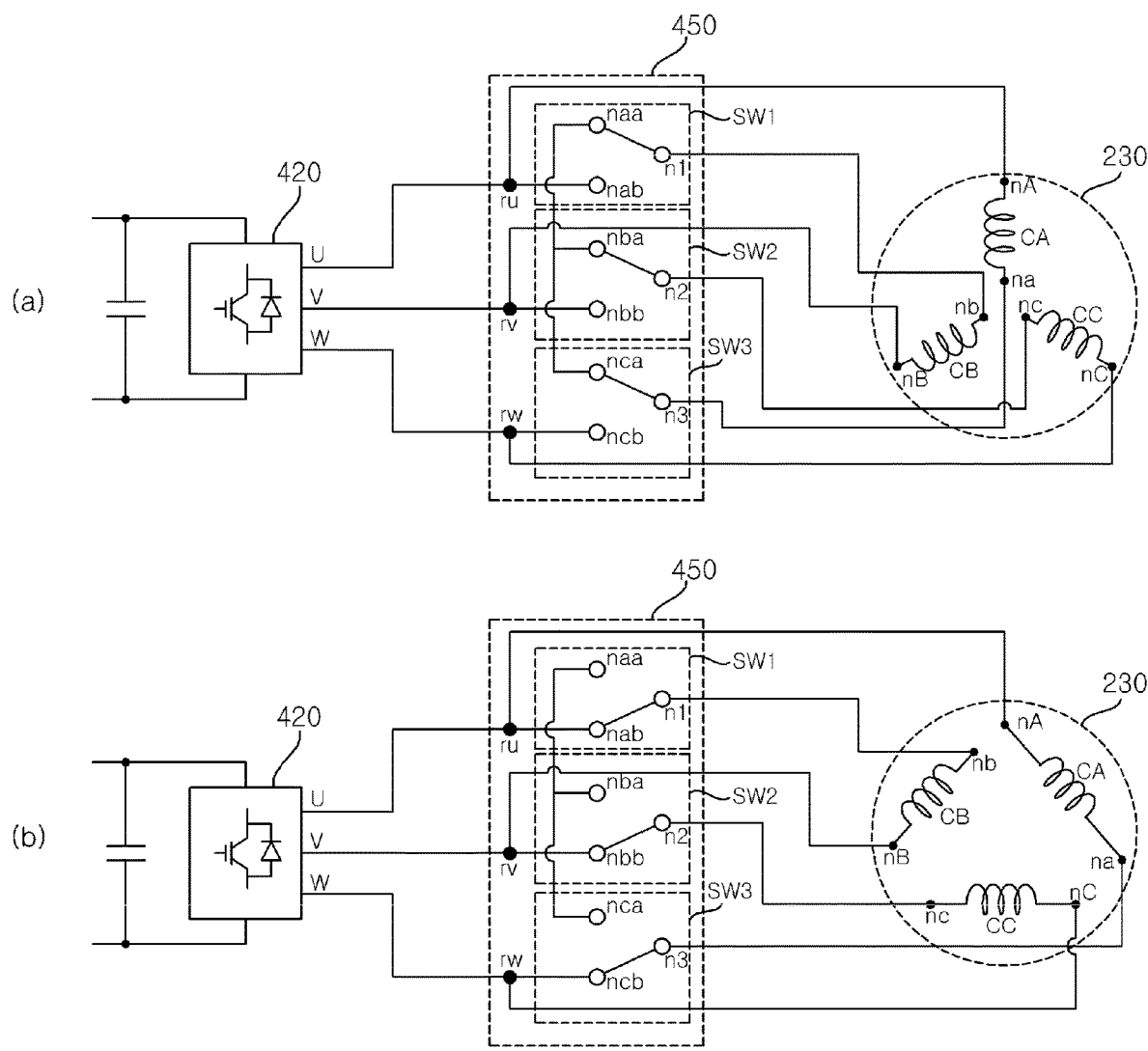
FIG. 7 is a diagram referred to in the description of an operation of a switching device of FIG. 4.

FIG. 7 is a diagram referred to in the description of an operation of a switching device of FIG. 4.

Referring to the drawing, (a) of FIG. 7 illustrates an example in which the switching device 450 operates such that the motor 230 is operated in Y-connection which is the first connection; and (b) of FIG. 7 illustrates an example in which the switching device 450 operates such that the motor 230 is operated in Δ-connection which is the second connection.

The switching device 450 includes the first to third relays SW1 to SW3 which are electrically connected to the respective phase outputs of the inverter 420.

A first terminal naa of the first relay SW1, a first terminal nba of the second relay SW2, and a first terminal nca of the third relay SW3 are connected in parallel, in which one end nA of a first winding CA of the motor 230 is connected to the second terminal nab of the first relay SW1; one end nB of a second winding CB of the motor 230 is connected to the second terminal nbb of the second relay SW2; one end nC of a third winding CC of the motor 230 is connected to the second terminal ncb of the third relay SW3; the other end na of the first winding CA of the motor 230 is connected to a common terminal n3 of the third relay SW3; the other end nb of the second winding CB of the motor 230 is connected to a common terminal n1 of the first relay SW1; and the other end nc of the third winding CC of the motor 230 is connected to the common terminal n2 of the second relay SW2.

The second terminal nab of the first relay SW1 is connected to a U-phase output terminal ru of the inverter 420, and the second terminal nbb of the second relay SW2 is connected to a V-phase output terminal ry of the inverter 420, and the second terminal ncb of the third relay SW3 is connected to a W-phase output terminal rw of the inverter 420.

As illustrated in (a) of FIG. 7, for the first connection, the controller 170 may control the common terminals n1, n2, and n3 of the first to third relays SW1 to SW3 to be electrically connected to the respective first terminals naa, nba, and nca of the first to third relays SW1 to SW3.

In this manner, output currents of the U-, V-, and W-phases of the inverter 420 may respectively flow through the a-phase coil CA, the b-phase coil CB, and the c-phase coil CC of the motor 230 which is in Y-connection.

As illustrated in (b) of FIG. 7, for the second connection, the controller 170 may control the common terminals n1, n2, and n3 of the first to third relays SW1 to SW3 to be electrically connected to the respective second terminals nab, nbb, and ncb of the first to third relays SW1 to SW3.

In this manner, output currents of the U-, V-, and W-phases of the inverter 420 may respectively flow through the b-phase coil CB, the c-phase coil CC, and the a-phase coil CA of the motor 230 which is in Δ-connection.

As a result, by the switching device 450, it is possible to control the motor 230 to be operated in either the first connection or the second connection, thereby increasing the power conversion efficiency or driving efficiency of the motor 230.

Figure 8A:
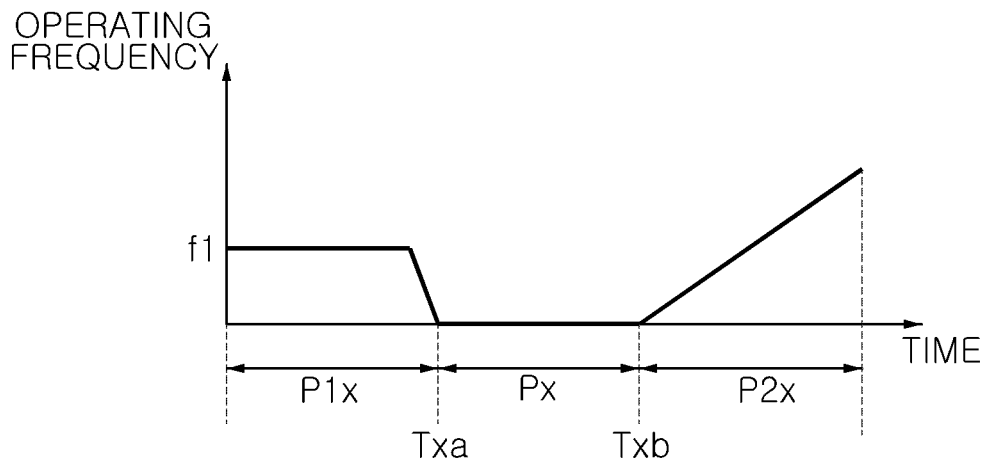
FIGS. 8A and 8B are timing diagrams illustrating a winding switching operation of the switching device of FIG. 7.
Figure 8B:
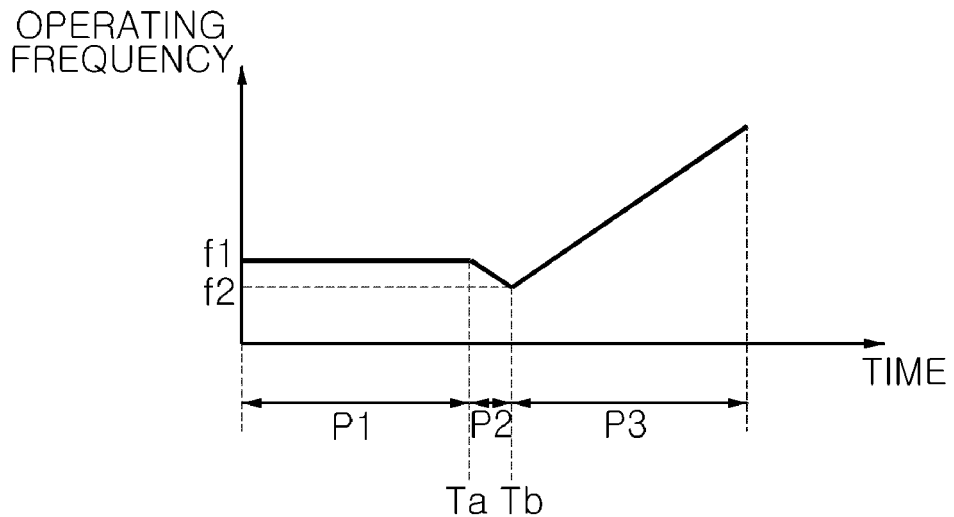

FIGS. 8A and 8B are timing diagrams illustrating a winding switching operation of the switching device of FIG. 7.

First, FIG. 8A is a timing diagram illustrating an example of a winding switching operation of the switching device of FIG. 7.

Referring to the drawing, when an operating frequency of the motor 230 is less than f1, the switching device 450 may operate for the motor 230 to be in Y-connection as illustrated in (a) of FIG. 7.

In the drawing, an example is illustrated in which during a period P1x up to a time point Txa, the switching device 450 operates for the motor 230 to be in Y-connection.

Then, during a period Px from Txa to Txb, the motor 230 may be stopped.

Subsequently, during a period P2x after the time point Txb, the switching device 450 may operate for the motor 230 to be in Δ-connection as illustrated in (b) of FIG. 7.

For example, if an operating frequency of the motor 230 exceeds f1, the switching device 450 may operate for the motor 230 to be in Δ-connection; and during the period Px, the motor 230 may be stopped for Y to Δ conversion.

Next, FIG. 8B is a timing diagram illustrating another example of a winding switching operation of the switching device.

Referring to the drawing, when an operating frequency of the motor 230 is less than or equal to f1, the switching device 450 may operate for the motor 230 to be in Y-connection.

In the drawing, an example is illustrated in which during a period P1 up to a time point Ta, the switching device 450 operates for the motor 230 to be in Y-connection.

Then, during a period P2 from Ta to Tb, the controller 170 or the inverter controller 430 may control windings of the motor 230 to be switched from the first connection to the second connection.

Particularly, the controller 170 or the inverter controller 430 may control the motor 230 not to stop during the period P2, and may control an operating frequency of the motor 230 to temporarily decrease from the first frequency f1 to the second frequency f2.

Subsequently, during a period P3 after the time period Tb, the switching device 450 may operate for the motor 230 to be in Δ-connection as illustrated in (b) of FIG. 7.

For example, if an operating frequency of the motor 230 exceeds f1, the controller 170 or the inverter controller 430 may control the switching device 450 to operate for the motor 230 to be in Δ-connection.

Specifically, during the period P3, the controller 170 or the inverter controller 430 may control the operating frequency of the motor 230, which is temporarily decreased to the second frequency f2, to increase again.

The controller 170 of the inverter controller 430 may control the motor 230 to operate continuously without stopping while the switching device 450 switches the windings of the motor 230 from the first connection to the second connection. In this manner, the motor 230 does not stop during the switching operation of the switching device 450, such that an operating efficiency of the motor 230 may be improved.

In this case, the period P2 of FIG. 8B is preferably shorter than the period Px of FIG. 8A. Accordingly, by temporarily decreasing the speed of the motor 230, the windings of the motor 230 may be switched from the first connection to the second connection.

Figure 9A:
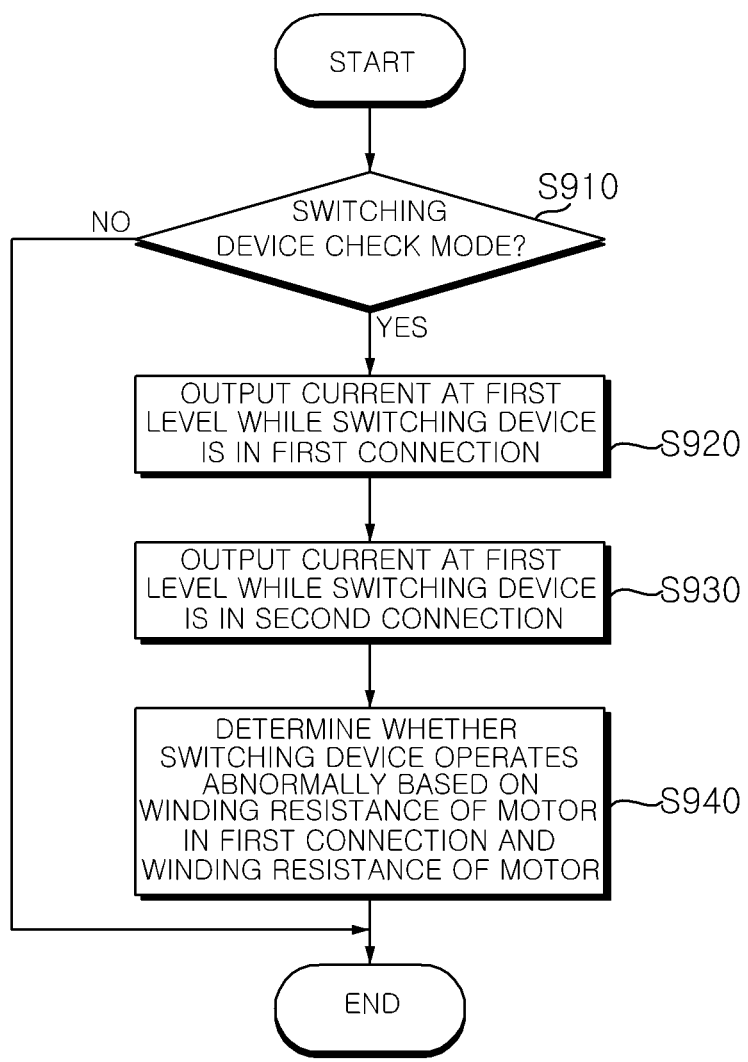
FIG. 9A is a flowchart illustrating an operating method of a motor driving apparatus according to an embodiment of the present disclosure.

FIG. 9A is a flowchart illustrating an operating method of a motor driving apparatus according to an embodiment of the present disclosure.

Referring to the drawing, the controller 170 or the inverter controller 430 determines whether a mode of the motor driving apparatus 220 is a switching device check mode for inspecting the switching device included in the motor driving apparatus 220 (S910).

For example, the controller 170 or the inverter controller 430 may perform the switching device check mode before driving the motor 230.

In another example, if a change in an operating frequency during the operation of the motor 230 is greater than or equal to a predetermined value, the controller 170 or the inverter controller 430 may perform the switching device check mode.

In the switching device check mode, the controller 170 or the inverter controller 430 may control the inverter 420 to output an output current at a first level during a first period in a state in which the windings of the motor 230 are connected in a first connection by the operation of the switching device 450 (S920).

Then, in the switching device check mode, the controller 170 or the inverter controller 430 may control the inverter 420 to output the output current at the first level, which is equal to the output current in the first connection, during a second period after the first period in a state in which the windings of the motor 230 are connected in a second connection by the operation of the switching device 450 (S930).

Subsequently, the controller 170 or the inverter controller 430 may determine whether the switching device 450 operates abnormally based on a winding resistance of the motor 230 in the first connection and a winding resistance of the motor 230 in the second connection (S940).

For example, based on a first output voltage Lvn3, detected according to an output of the output current io at the first level Lvn1 during the first period Pn1, the controller 170 or the inverter controller 430 may calculate a first winding resistance of the motor 230, and based on a second output voltage Lvn4, detected according to an output of the output current io at the first level Lvn1 during the second period Pn2, the controller 170 or the inverter controller 430 may calculate a second winding resistance of the motor 230, and then may determine whether the switching device 450 operates abnormally based on the first winding resistance and the second winding resistance. Accordingly, the controller 170 or the inverter controller 430 may simply determine whether the switching device 450 for switching the windings of the motor 230 is abnormal.

Specifically, the controller 170 or the inverter controller 430 may calculate a ratio between the first winding resistance and the second winding resistance, and based on the calculated ratio, the controller 170 or the inverter controller 430 may determine whether the switching device 450 for switching the windings of the motor 230 operates abnormally.

Meanwhile, the controller 170 or the inverter controller 430 may calculate ratios between the first winding resistance and the second winding resistance for each phase, and if ratios of all the phases, among the calculated ratios, are within a predetermined range, the controller 170 or the inverter controller 430 may determine that the switching device 450 is normal, and may control the switching device 450 to switch the windings of the motor 230 from the first connection to the second connection according to an operating frequency of the motor 230. Accordingly, when the switching device 450 operates normally, the power conversion efficiency or driving efficiency of the motor 230 may be increased.

Figure 9B:
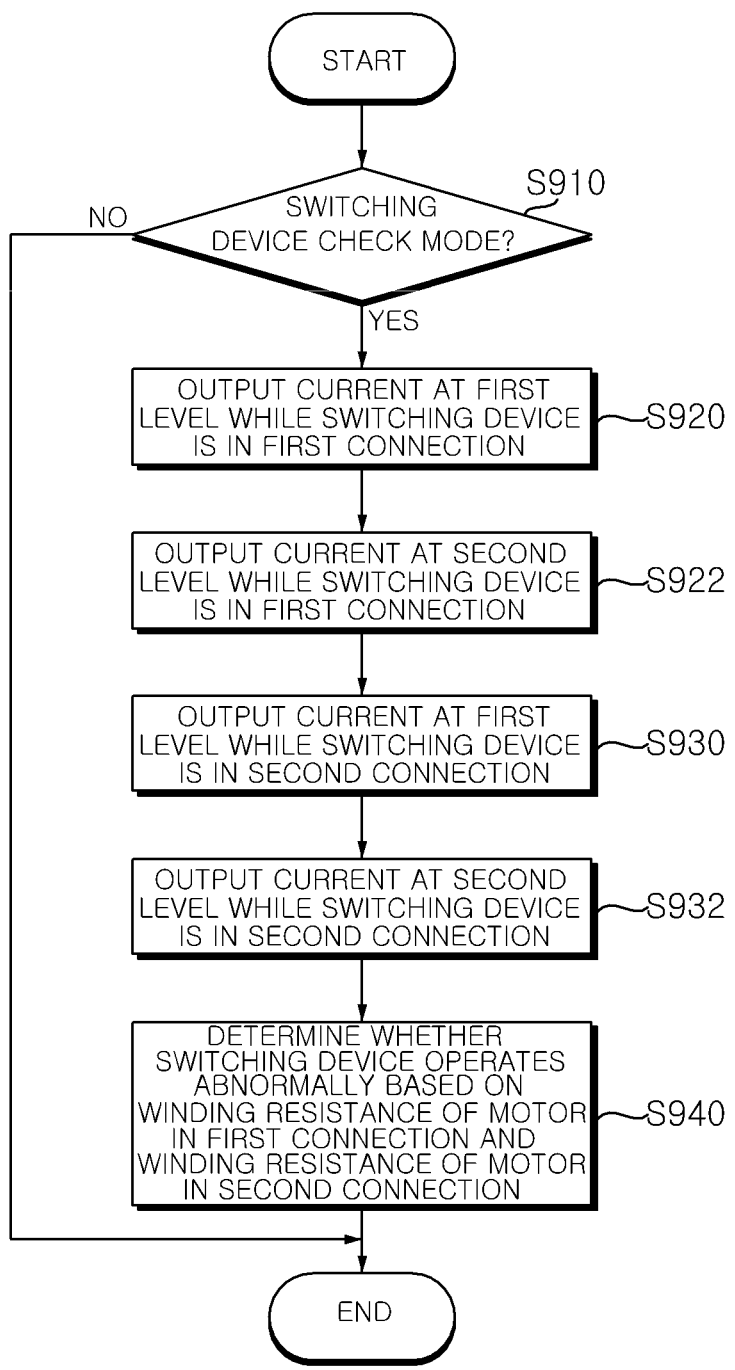
FIG. 9B is a flowchart illustrating an operating method of a motor driving apparatus according to an embodiment of the present disclosure.

FIG. 9B is a flowchart illustrating an operating method of a motor driving apparatus according to an embodiment of the present disclosure.

Referring to the drawing, the operating method of FIG. 9B is similar to the operating method of FIG. 9A, but there is a difference in that not only the output current at the first level but also output currents at a plurality of levels are output.

Accordingly, the operations 910 (S910), 920 (S920), 930 (S930), and 940 (S940) will be described with reference to FIG. 9A.

In the operation 920 (S920), in the switching device check mode, the controller 170 or the inverter controller 430 may control the inverter 420 to output the output current at the first level during a first period in a state in which the windings of the motor 230 are connected in the first connection by the operation of the switching device 450.

Then, the controller 170 or the inverter controller 430 may control the inverter 420 to output an output current at a second level, which is different from the first level, during the first period after the output current at the first level is output, while the windings of the motor 230 are connected in the first connection by the operation of the switching device 450 (S922).

For example, the second level may be higher than the first level.

Subsequently, in the switching device check mode, the controller 170 or the inverter controller 430 may control the inverter 420 to output the output current at the first level during a second period in a state in which the windings of the motor 230 are connected in a second connection by the operation of the switching device 450 (S930).

Next, the controller 170 or the inverter controller 430 may control the inverter 420 to output the output current at the second level, which is different from the first level, during the second period after the output current at the first level is output, while the windings of the motor 230 are connected in the second connection by the operation of the switching device 450 (S932).

The first level and the second level in the second connection may be equal to the first level and the second level in the first connection, respectively.

Then, based on a winding resistance of the motor 230 in the first connection and the winding resistance of the motor 230 in the second connection, the controller 170 or the inverter controller 430 may determine whether the switching device 450 operates abnormally (S940).

For example, the controller 170 or the inverter controller 430 may calculate a first winding resistance of the motor 230 based on an output voltage Lvm3 detected according to an output of an output current at a first level Lvm1 during a first period Pm1, and an output voltage Lvm4 detected according to an output of an output current at a second level Lvm2; and the controller 170 or the inverter controller 430 may calculate a second winding resistance of the motor 230 based on an output voltage Lvm5 detected according to the output of the output current at the first level Lvm1 during the first period Pm1 and the second period Pm2, and an output voltage Lvm6 detected according to the output of the output current at the second level Lvm2. Based on the first winding resistance and the second winding resistance, the controller 170 or the inverter controller 430 may determine whether the switching device 450 operates abnormally, thereby simply determining an abnormal operation of the switching device 450 for switching connection of the motor 230.

Specifically, the controller 170 or the inverter controller 430 may calculate a ratio between the first winding resistance and the second winding resistance and may determine whether the switching device 450 operates abnormally based on the calculated ratio, thereby simply determining an abnormal operation of the switching device 450 for switching connection of the motor 230.

Meanwhile, the controller 170 or the inverter controller 430 may calculate ratios between the first winding resistance and the second winding resistance for each phase, and if ratios of all the phases among the calculated ratios are within a predetermined range, the controller 170 or the inverter controller 430 may determine that the switching device 450 is normal and may control the switching device 450 to switch the windings of the motor 230 from the first connection to the second connection according to an operating frequency of the motor 230. Accordingly, when the switching device 450 operates normally, the power conversion efficiency or driving efficiency of the motor 230 may be increased.

FIGS. 10A to 14C are diagrams referred to in the description of the operating method of FIG. 9A or FIG. 9B.

Figure 10A:
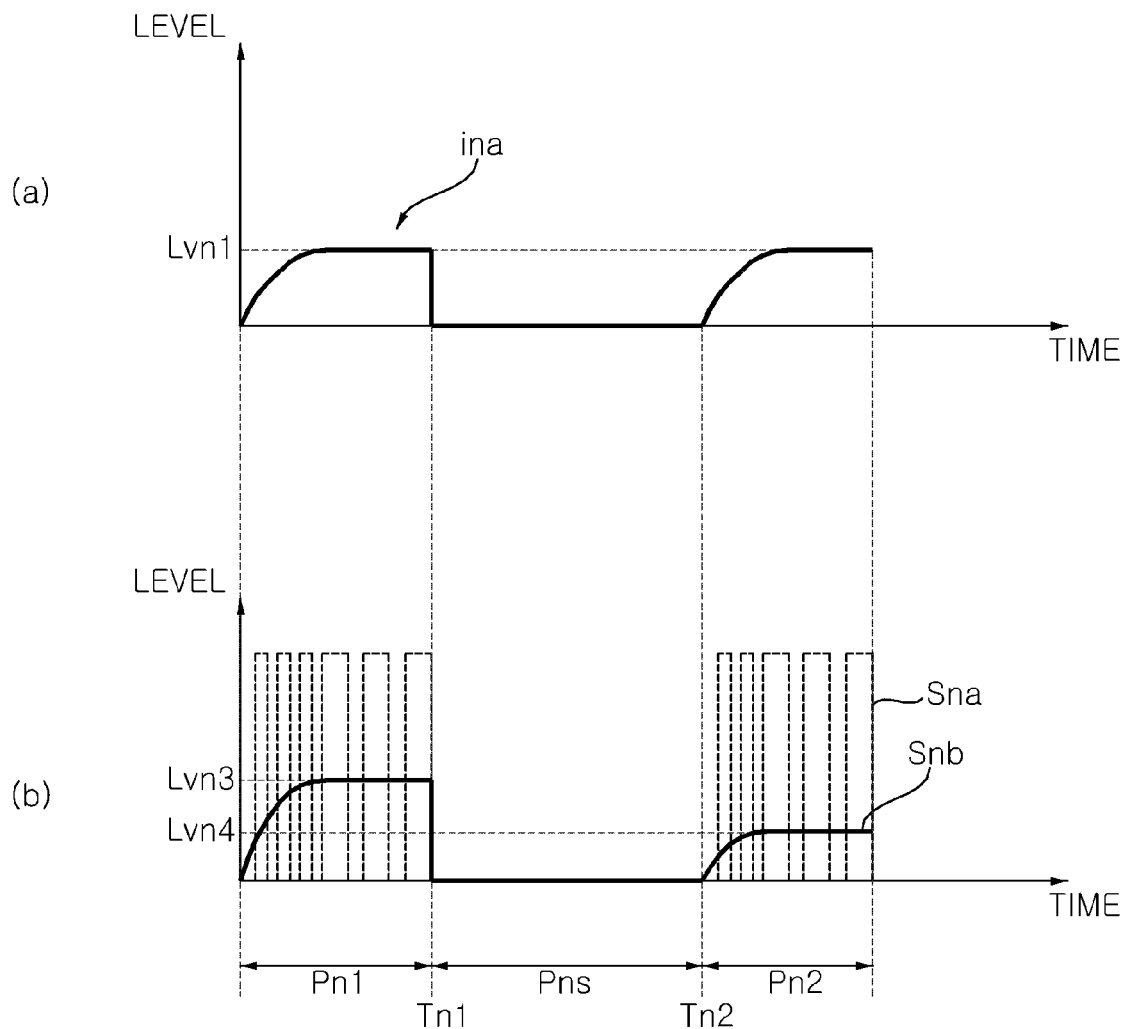
FIGS. 10A to 14C are diagrams referred to in the description of the operating method of FIGS. 9A and 9B.

First, FIG. 10A is a diagram referred to in the description of the operating method of FIG. 9A.

Referring to the drawing, (a) of FIG. 10A illustrates an output current ina, particularly a phase current, which is output from the inverter 420.

During the period Pn1, the inverter controller 430 may control the inverter 420 to output an output current at the first level Lvn1 while the windings of the motor 230 are connected in the first connection by the operation of the switching device 450.

A period Pns after the period P1 may be a period of conversion from the first connection to the second connection, in which a current may not be output from the inverter 420.

Unlike the drawing, a current at a lower level than the first level Lvn1 may also be output during the period Pns. By the output of such output current, a speed of the motor 230 may be temporarily decreased during the period P2 of FIG. 8B.

Then, during the period P2 after the period Pns, the inverter controller 430 may control the inverter 420 to output the output current at the first level Lvn1 while the windings of the motor 230 are connected in the second connection by the operation of the switching device 450.

In FIG. 10A, (b) illustrates a switching voltage Sna corresponding to the output current ina output from the inverter 420, and an output voltage Snb which is an effective voltage.

Meanwhile, the output voltage Snb may correspond to the phase voltage.

During a period up to a time point tn1, which is an end point of the period Pn1, a pulse width of the switching voltage Sna increases and then is maintained at a constant level, and the output voltage increases and then is maintained at a third level Lvn3.

During the period Pns following the period Pn1, the output voltage becomes zero; and during the period P2 from a time point Tn2 after the period Pns, a pulse width of the switching voltage Sna increases and then is maintained at a constant level, and the output voltage increases and then is maintained at a fourth level Lvn4 which is lower than the third level Lvn3.

As illustrated in (b) of FIG. 10A, the controller 170 or the inverter controller 430 may calculate the first winding resistance in the first connection and the second winding resistance in the second connection based on a difference in the output voltage Snb between the first connection and the second connection.

Meanwhile, the output current output from the inverter 420 is the same, such that if the operation of the switching device 450 is normal, the first winding resistance, having a greater output voltage SNb, is greater than the second winding resistance.

Based on such characteristics, the controller 170 or the inverter controller 430 may determine whether the switching device 450 operates abnormally.

Unlike FIG. 10A in which one phase current ina is illustrated, the controller 170 or the inverter controller 430 may control each of a U-phase current, a V-phase current, and a W-phase current at output terminals of each phase of the inverter 420 to sequentially have waveforms of FIG. 10A.

Based on a relationship of R=V/I, the controller 170 or the inverter controller 430 may calculate the first winding resistance in the first connection and the second winding resistance in the second connection.

In this case, if the ratio between the winding resistance in the first connection and the winding resistance in the second connection is maintained within a predetermined range, the controller 170 or the inverter controller 430 may determine that the switching device 450 is normal, and if the ratio falls outside the predetermined range, the controller 170 or the inverter controller 430 may determine that the switching device 450 is abnormal.

Further, based on whether the first winding resistance in the first connection is within a first range, the controller 170 or the inverter controller 430 may determine that the switching device 450 is normal or abnormal.

In addition, based on whether the second winding resistance in the second connection is within a second range, the controller 170 or the inverter controller 430 may determine that the switching device 450 is normal or abnormal.

Figure 10B:
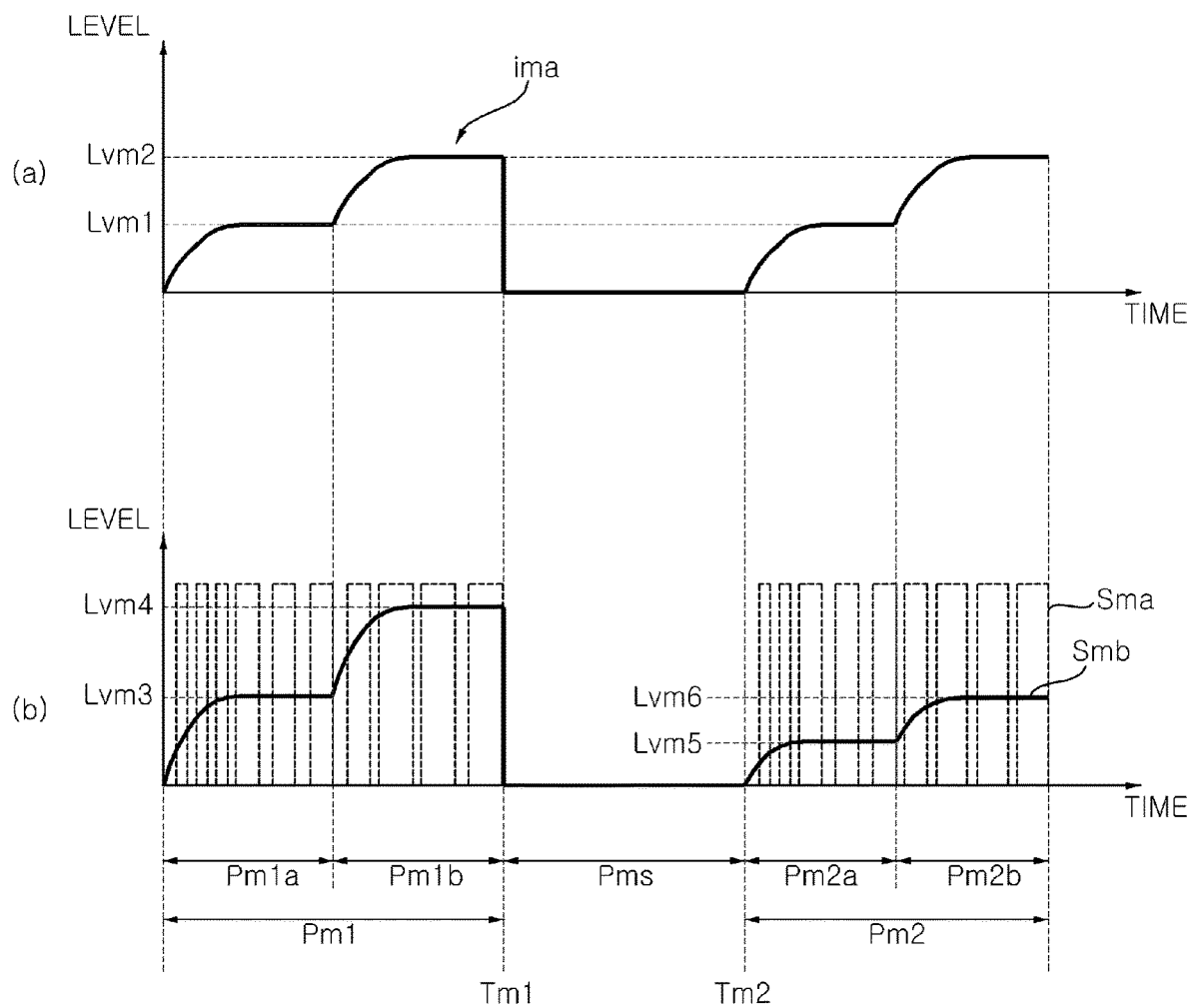

Next, FIG. 10B is a diagram referred to in the description of the operating method of FIG. 9B.

Referring to the drawing, (a) of FIG. 10B illustrates an output current ima, particularly a phase current, which is output from the inverter 420.

During a period Pm1a in the period Pm1, the inverter controller 430 may control the inverter 420 to output the output current at the first level Lvm1 while the motor 230 is in the first connection by the operation of the switching device 450.

Then, during a period Pm1b in the period Pm1, the inverter controller 430 may control the inverter 420 to output the output current at the second level Lvm2, which is greater than the first level Lvm1, while the motor 230 is in the first connection by the operation of the switching device 450.

A period Pms following the period Pm1 is an interval of conversion from the first connection to the second connection, in which a current may not be output from the inverter 420.

Unlike the drawing, a current at a lower level than the first level Lvm1 may also be output during the period Pms. By the output of such output current, a speed of the motor 230 may be temporarily decreased during the period P2 of FIG. 8B.

Then, during a period Pm2a in the period Pm2 after the period Pms, the inverter controller 430 may control the inverter 420 to output the output current at the first level Lvm1 while the motor 230 is in the second connection by the operation of the switching device 450.

Subsequently, during a period Pm2b in the period Pm2, the inverter controller 430 may control the inverter 420 to output the output current at the second level Lvm2, which is greater than the first level Lvm1, while the motor 230 is in the second connection by the operation of the switching device 450.

In FIG. 10B, (b) illustrates a switching voltage Sma corresponding to the output current ima output from the inverter 420, and an output voltage Smb which is an effective voltage.

Meanwhile, the output voltage Smb may correspond to the phase voltage.

During the period Pm1a in the period Pm1, a pulse width of the switching voltage Sma increases and then is maintained at a constant level, and the output voltage increases and then is maintained at a third level Lvm3; and during the period Pm1b in the period Pm1, a pulse width of the switching voltage Sma increases again and then is maintained at a constant level, and the output voltage increases again and then is maintained at a fourth level Lvm4.

During the period Pms following the period Pm1, the output voltage becomes zero.

During the period Pm2a in the period P2 from a time point Tm2 after the period Pms, a pulse width of the switching voltage Sma increases and then is maintained at a constant level, and the output voltage increases and then is maintained at a fifth level Lvm5; and during the period Pm2b in the period Pm2, a pulse width of the switching voltage Sma increases again and then is maintained at a constant level, and the output voltage increases again and then is maintained at a sixth level Lvm6.

In this case, the fifth level Lvm5 may be lower than the third level Lvm3, and the sixth level Lvm6 may be lower than the fourth level Lvm4.

As illustrated in (b) of FIG. 10B, the controller 170 or the inverter controller 430 may calculate the first winding resistance in the first connection and the second winding resistance in the second connection based on a difference in the output voltage Sbm between the first connection and the second connection.

Compared to FIG. 10A, by outputting the output current at various levels and calculating a winding resistance based on the output current, accuracy of the calculated winding resistance may be further improved.

Particularly, compared to FIG. 10A, by outputting the output current at various levels, an influence of a component other than a stator resistance may be removed, such that accuracy of the calculated winding resistance may be further improved.

Meanwhile, the output current output from the inverter 420 is the same, such that if the operation of the switching device 450 is normal, the first winding resistance having a greater output voltage Smb is greater than the second winding resistance.

Based on such characteristics, the controller 170 or the inverter controller 430 may determine whether the switching device 450 operates abnormally.

Unlike FIG. 10B in which one phase current ima is illustrated, the controller 170 or the inverter controller 430 may control each of a U-phase current, a V-phase current, and a W-phase current at output terminals of each phase of the inverter 420 to sequentially have waveforms of FIG. 10B.

Figure 11:
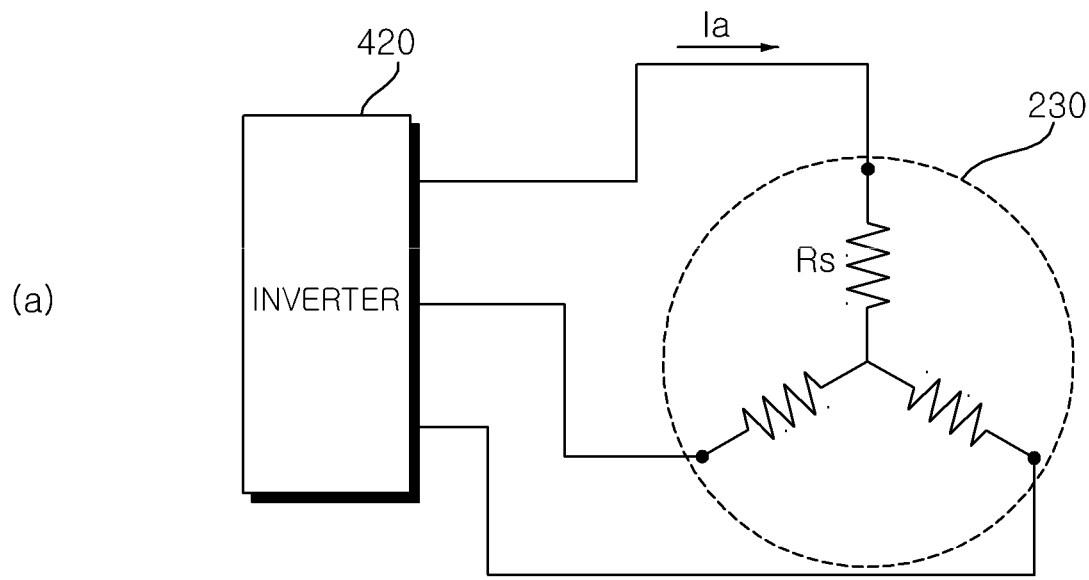
Figure 11:
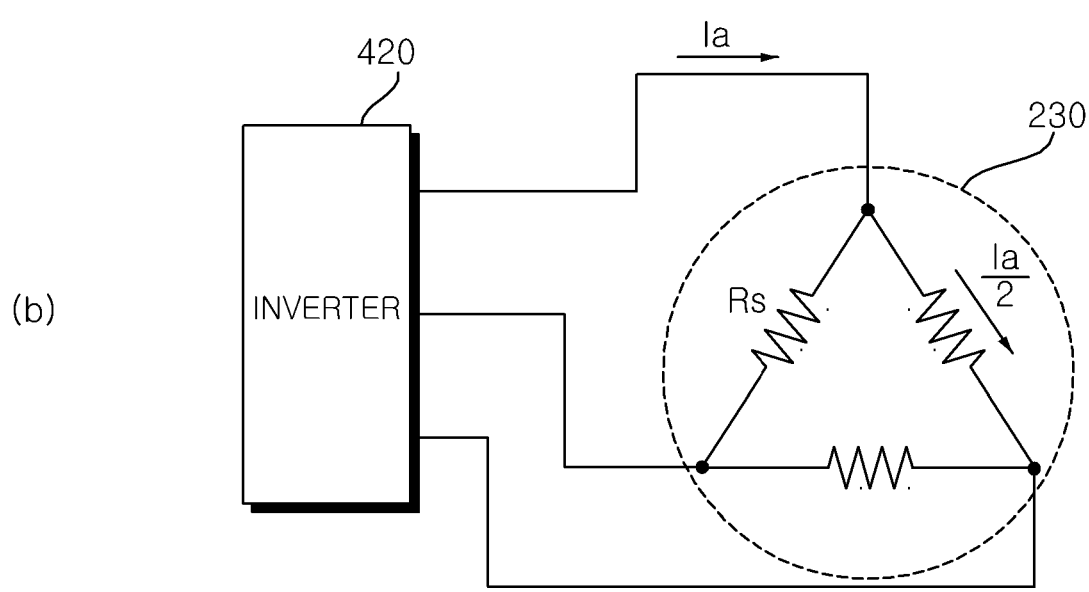

FIG. 11 is a schematic equivalent circuit diagram of the motor in the first connection and the second connection.

Referring to the drawing, (a) of FIG. 11 illustrates an equivalent circuit diagram of the motor 230 in Y-connection which is the first connection.

Meanwhile, if a voltage Va is applied to control a current Ia in Y-connection, a stator winding resistance is 3/2Ra.

Then, (b) of FIG. 11 illustrates an equivalent circuit diagram of the motor 230 connected in Δ-connection which is the first connection.

Meanwhile, if the output current Ia is output in Δ-connection, the voltage Va is reduced to one third of a value in Y-connection, since the winding resistance is reduced to 1/2Ra.

Accordingly, based on the difference, the controller 170 or the inverter controller 430 may confirm whether the connection is changed normally by the switching device 450.

Figures 12A, 12B:
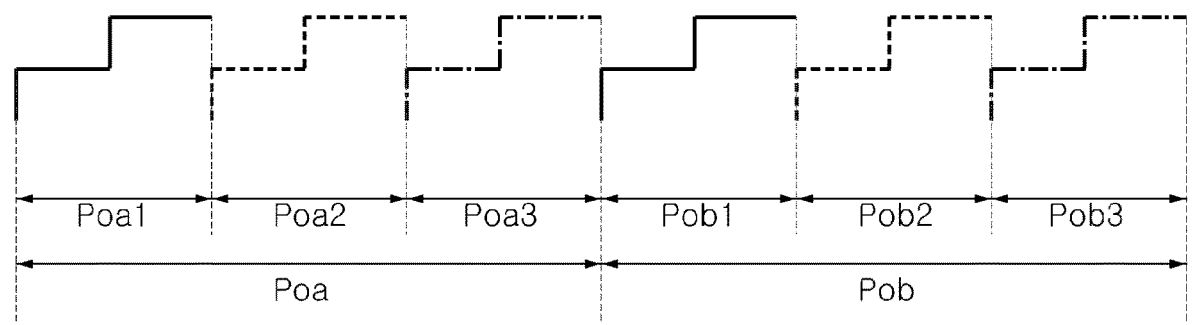

FIG. 12A is a diagram illustrating output voltages which are detected as phase currents at the first level and the second level in the first connection and the second connection are sequentially applied.

Referring to the drawing, as U-phase, V-phase, and W-phase output currents at the first level Lvm1 and the second level Lvm2 are output in the first connection during a period Poa of FIG. 12A, a U-phase output voltage during a period Poa1, a V-phase output voltage during a period Poa2, and a W-phase output voltage during a period Poa3 are detected.

As illustrated in the drawing, each of the U-phase, V-phase, and W-phase output voltages during the period Poa may have two voltage levels.

Based on each of the U-phase, V-phase, and W-phase output currents at the first level Lvm1 and the second level Lvm2 and each of the U-phase, V-phase, and W-phase output voltages in the first connection, the controller 170 or the inverter controller 430 may calculate a first winding resistance of each of the U-phase, V-phase, and W-phase.

Then, as the U-phase, V-phase, and W-phase output currents at the first level Lvm1 and the second level Lvm2 are output in the second connection during a period Pob of FIG. 12A, the U-phase output voltage during a period Pob1, the V-phase output voltage during a period Pob2, and the W-phase output voltage during a period Pob3 are detected.

As illustrated in the drawing, each of the U-phase, V-phase, and W-phase output voltages during the period Pob may have two voltage levels.

Based on each of the U-phase, V-phase, and W-phase output currents at the first level Lvm1 and the second level Lvm2 and each of the U-phase, V-phase, and W-phase output voltages in the second connection, the controller 170 or the inverter controller 430 may calculate a second winding resistance of each of the U-phase, V-phase, and W-phase.

Further, the controller 170 or the inverter controller 430 may determine whether the switching device 450 is abnormal based on the first winding resistance and the second winding resistance of each of the U-phase, V-phase, and W-phase.

FIG. 12B is a diagram illustrating the first winding resistance and the second winding resistance of each of the U-phase, V-phase, and W-phase, and a ratio therebetween, in the case where the switching device 450 operates normally.

Referring to the drawing, a U-phase winding resistance, a V-phase winding resistance, and a W-phase winding resistance in the first connection may be 0.96Ω, 0.96Ω, and 0.97Ω, respectively.

Each of the U-phase winding resistance, the V-phase winding resistance, and the W-phase winding resistance may correspond to a winding resistance corresponding to an a-phase winding CA, a winding resistance corresponding to a b-phase winding CB, and a winding resistance corresponding to a c-phase winding CC of FIG. 7.

Meanwhile, a U-phase winding resistance, a V-phase winding resistance, and a W-phase winding resistance in the second connection may be 0.41Ω, 0.42Ω, and 0.42Ω, respectively.

In this regard, a U-phase winding resistance ratio, a V-phase winding resistance ratio, and a W-phase winding resistance ratio, which are winding resistance ratios of the first connection to the second connection, may be 2.3, 2.3, and 2.3, respectively.

That is, when the switching device 450 operates normally, a first range, which is a normal range of the winding resistance in the first connection, is preferably approximately 0.7Ω to 1.2Ω; a second range, which is a normal range of the winding resistance in the second connection, is preferably approximately 0.3Ω to 0.6Ω; and a third range, which is a normal range of the winding resistance ratios of the first connection to the second connection is preferably approximately 2.0Ω to 2.5Ω.

Based on such data of FIG. 12B, the controller 170 or the inverter controller 430 may determine abnormality of the switching device 450.

For example, the controller 170 or the inverter controller 430 may calculate ratios between the first winding resistance and a second winding resistance for each of the U-phase, V-phase, and W-phase; and among the calculated ratios, if a ratio of at least one phase falls outside a predetermined range, the controller 170 or the inverter controller 430 may determine that the switching device 450 is abnormal, and may control the windings of the motor 230 to be operated in at least either the first connection or the second connection. As described above, if the switching device 450 is abnormal, the controller 170 or the inverter controller 430 may control the windings of the motor 230 to be operated only in any one connection, thereby allowing the motor 230 to perform an emergency operation.

Meanwhile, the controller 170 or the inverter controller 430 may calculate the first winding resistance and the second winding resistance for each of the U-phase, V-phase, and W-phase; and if a range of the first winding resistance for each of the U-phase, V-phase, and W-phase falls outside a first range, and a range of the second winding resistance for each of the U-phase, V-phase, and W-phase falls outside a second range, the controller 170 or the inverter controller 430 may determine that the motor 230 is out of order, thereby simply determining a failure of the motor 230.

Meanwhile, the controller 170 or the inverter controller 430 may calculate the first winding resistance and the second winding resistance for each of the U-phase, V-phase, and W-phase; and if a range of the first winding resistance for each of the U-phase, V-phase, and W-phase is within a first range, and a range of the second winding resistance for each of the U-phase, V-phase, and W-phase is within a second range, the controller 170 or the inverter controller 430 may determine that the motor 230 is normal, and may control the switching device 450 to switch the windings of the motor 230 from the first connection to the second connection according to an operating frequency of the motor 230. Accordingly, if the switching device 450 operates normally, the power conversion efficiency or driving efficiency of the motor 230 may be increased.

Meanwhile, the controller 170 or the inverter controller 430 may calculate the first winding resistance and the second winding resistance for each of the U-phase, V-phase, and W-phase; and if a range of the first winding resistance for each of the U-phase, V-phase, and W-phase is within a first range, and if a range of the second winding resistance for each of the U-phase, V-phase, and W-phase falls outside a second range, the controller 170 or the inverter controller 430 may determine that the switching device 450 is abnormal, and may control the windings of the motor 230 to be operated only in the first connection. Accordingly, if the switching device 450 is abnormal, the controller 170 or the inverter controller 430 controls the windings of the motor 230 to be operated only in any one connection, thereby allowing the motor 230 to perform an emergency operation.

Meanwhile, the controller 170 or the inverter controller 430 may calculate the first winding resistance and the second winding resistance for each of the U-phase, V-phase, and W-phase; and if a range of the first winding resistance for each of the U-phase, V-phase, and W-phase falls outside a first range, and if a range of the second winding resistance for each of the U-phase, V-phase, and W-phase is within a second range, the controller 170 or the inverter controller 430 may determine that the switching device 450 is abnormal, and may control the windings of the motor 230 to be operated only in the second connection. Accordingly, if the switching device 450 is abnormal, the controller 170 or the inverter controller 430 controls the windings of the motor 230 to be operated only in any one connection, thereby allowing the motor 230 to perform an emergency operation.

Figure 13A:
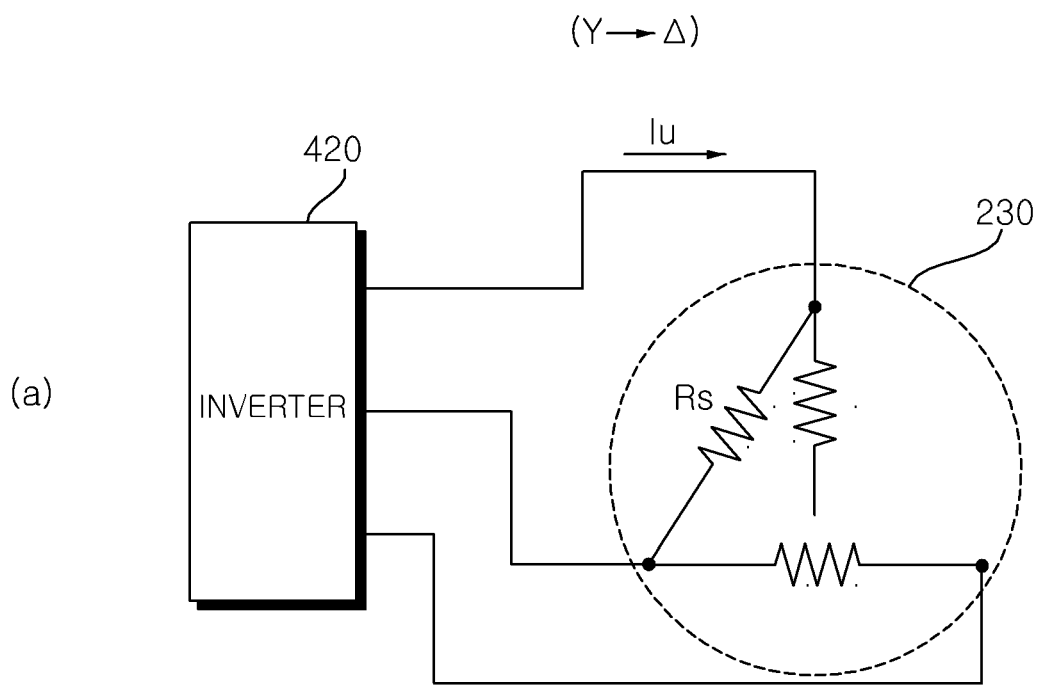
Figure 13B:
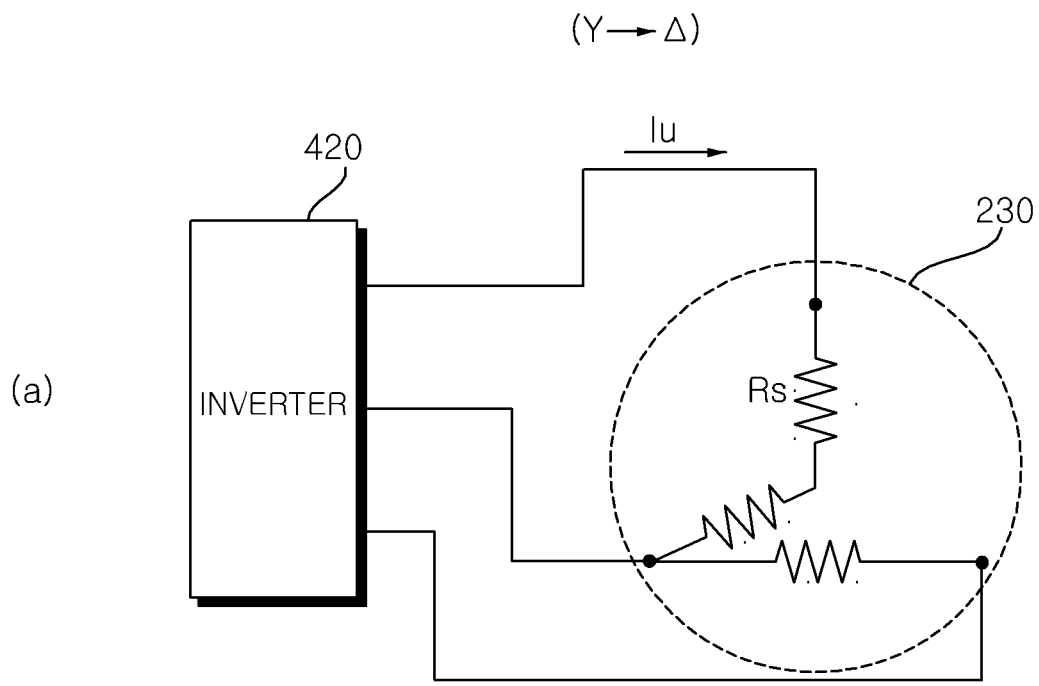
Figure 13C:
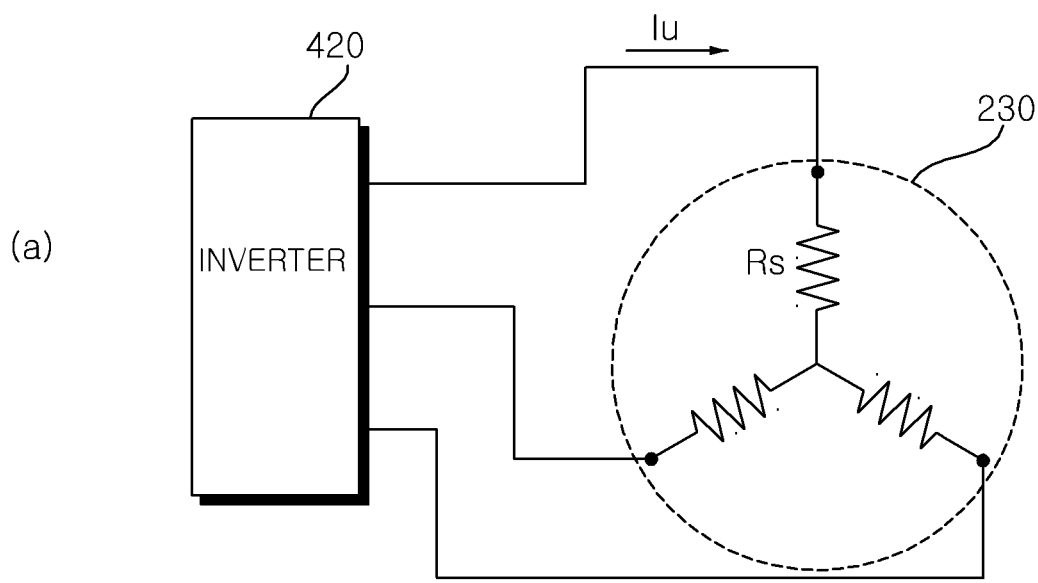

FIGS. 13A to 13C are diagrams illustrating the first winding resistance and the second winding resistance for each of the U-phase, V-phase, and W-phase, and a ratio therebetween, in the case where the first connection is switched to the second connection.

First, (a) of FIG. 13A illustrates an equivalent circuit diagram of the motor 230 in the case where one relay in the switching device 450 operates abnormally.

Then, (b) of FIG. 13A illustrates the first winding resistance in the case of (a) of FIG. 13A, the second winding resistance of each of the U-phase, V-phase, and W-phase, and a ratio therebetween.

Referring to the drawings, the U-phase winding resistance, the V-phase winding resistance, and the W-phase winding resistance in the first connection may be 0.97Ω, 0.97Ω, and 0.97Ω, respectively.

Meanwhile, the U-phase winding resistance, the V-phase winding resistance, and the W-phase winding resistance in the second connection may be 0.71Ω, 0.41Ω, and 0.72Ω, respectively.

In this regard, a U-phase winding resistance ratio, a V-phase winding resistance ratio, and a W-phase winding resistance ratio, which are winding resistance ratios of the first connection to the second connection may be 1.4, 2.4, and 1.4, respectively.

As the winding resistance ratio of the first connection to the second connection is within a third range, which is a normal range, only for the V-phase, the controller 170 or the inverter controller 430 may determine that only the V-phase resistance ratio is normal, and the U-phase and W-phase resistance ratios are abnormal.

Meanwhile, as all the U-phase winding resistance, the V-phase winding resistance, and the W-phase winding resistance are within the first range which is a normal range, the controller 170 or the inverter controller 430 may determine that the operation of the switching device 450 in the first connection is normal.

Meanwhile, among the U-phase winding resistance, the V-phase winding resistance, and the W-phase winding resistance, only the V-phase winding resistance is within the second range which is a normal range, and the U-phase winding resistance and the W-phase winding resistance fall outside the second range, such that the controller 170 or the inverter controller 430 may determine that the operation of the switching device 450 in the second connection is abnormal.

Accordingly, in the case of (a) of FIG. 13A, the controller 170 or the inverter controller 430 may control the switching device 450 to be operated only in the first connection, instead of the second connection.

In FIG. 13B, (a) illustrates an equivalent circuit diagram of the motor 230 in the case where two relays in the switching device 450 operate abnormally.

Then, (b) of FIG. 13B illustrates the first winding resistance in the case of (a) of FIG. 13B, the second winding resistance of each of the U-phase, V-phase, and W-phase, and a ratio therebetween.

Referring to the drawings, the U-phase winding resistance, the V-phase winding resistance, and the W-phase winding resistance in the first connection may be 0.89Ω, 0.89Ω, and 0.90Ω, respectively.

Meanwhile, the U-phase winding resistance, the V-phase winding resistance, and the W-phase winding resistance in the second connection may be 1.20Ω, 0.47Ω, and 0.64Ω, respectively.

In this regard, a U-phase winding resistance ratio, a V-phase winding resistance ratio, and a W-phase winding resistance ratio, which are winding resistance ratios of the first connection to the second connection, may be 0.7, 1.9, and 1.4, respectively.

As the winding resistance ratios of the first connection to the second connection fall outside a third range, which is a normal range, for all the three phases, the controller 170 or the inverter controller 430 may determine that the operation of the switching device 450 is abnormal.

Meanwhile, as all the U-phase winding resistance, the V-phase winding resistance, and the W-phase winding resistance are within the first range, which is a normal range, the controller 170 or the inverter controller 430 may determine that the operation of the switching device 450 in the first connection is normal.

Meanwhile, among the U-phase winding resistance, the V-phase winding resistance, and the W-phase winding resistance in the second connection, only the V-phase winding resistance is within the second range, which is a normal range, and the U-phase winding resistance and the W-phase winding resistance fall outside the second range, such that the controller 170 or the inverter controller 430 may determine that the operation of the switching device 450 in the second connection is abnormal.

Accordingly, in the case of (a) of FIG. 13B, the controller 170 or the inverter controller 430 may control the switching device 450 to be operated only in the first connection, instead of the second connection.

In FIG. 13C, (a) illustrates an equivalent circuit diagram of the motor 230 in the case where three relays in the switching device 450 operate abnormally.

Then, (b) of FIG. 13C illustrates the first winding resistance in the case of (a) of FIG. 13C, the second winding resistance for each of the U-phase, V-phase, and W-phase, and a ratio therebetween.

Referring to the drawings, the U-phase winding resistance, the V-phase winding resistance, and the W-phase winding resistance in the first connection may be 0.97Ω, 0.97Ω, and 0.97Ω, respectively.

Meanwhile, the U-phase winding resistance, the V-phase winding resistance, and the W-phase winding resistance in the second connection may be 0.96Ω, 0.98Ω, and 0.97Ω, respectively.

In this regard, a U-phase winding resistance ratio, a V-phase winding resistance ratio, and a W-phase winding resistance ratio, which are winding resistance ratios of the first connection to the second connection, may be 1.0, 0.99, and 1.0, respectively.

The winding resistance ratios of the first connection to the second connection fall outside a third range, which is a normal range, for all the three phases, such that the controller 170 or the inverter controller 430 may determine that the operation of the switching device 450 is abnormal.

Meanwhile, all the U-phase winding resistance, the V-phase winding resistance, and the W-phase winding resistance in the first connection are within the first range, which is a normal range, such that the controller 170 or the inverter controller 430 may determine that the operation of the switching device 450 in the first connection is normal.

Meanwhile, all the U-phase winding resistance, the V-phase winding resistance, and the W-phase winding resistance in the second connection fall outside the second range which is a normal range, such that the controller 170 or the inverter controller 430 may determine that the operation of the switching device 450 in the second connection is abnormal.

Accordingly, in the case of (a) of FIG. 13C, the controller 170 or the inverter controller 430 may control the switching device 450 to be operated only in the first connection, instead of the second connection.

Figure 14A:
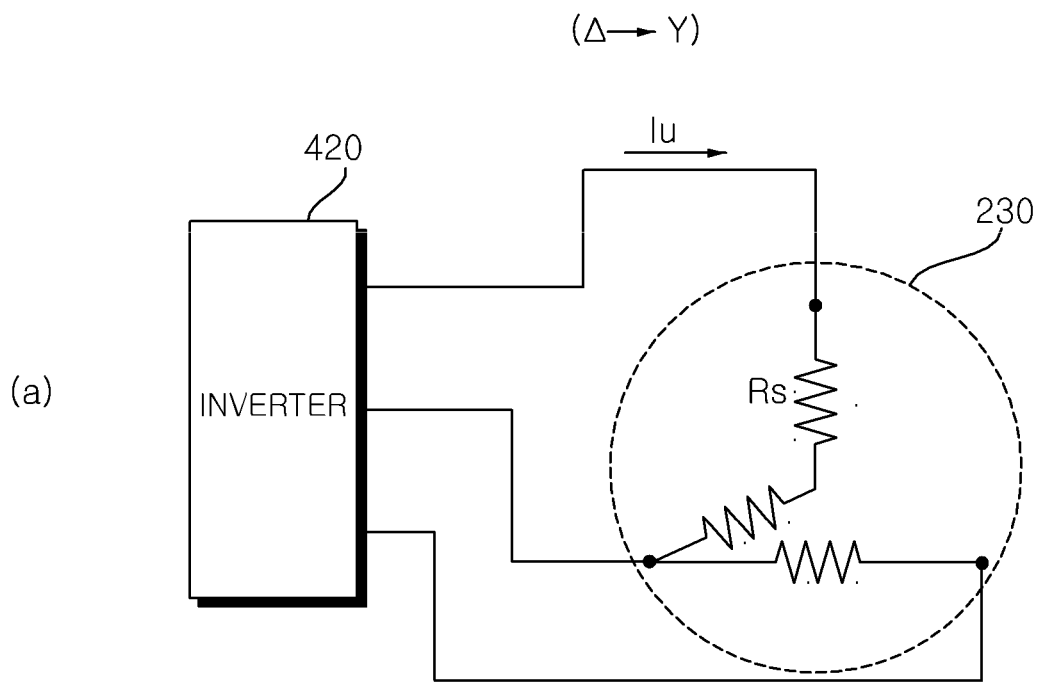
Figure 14B:
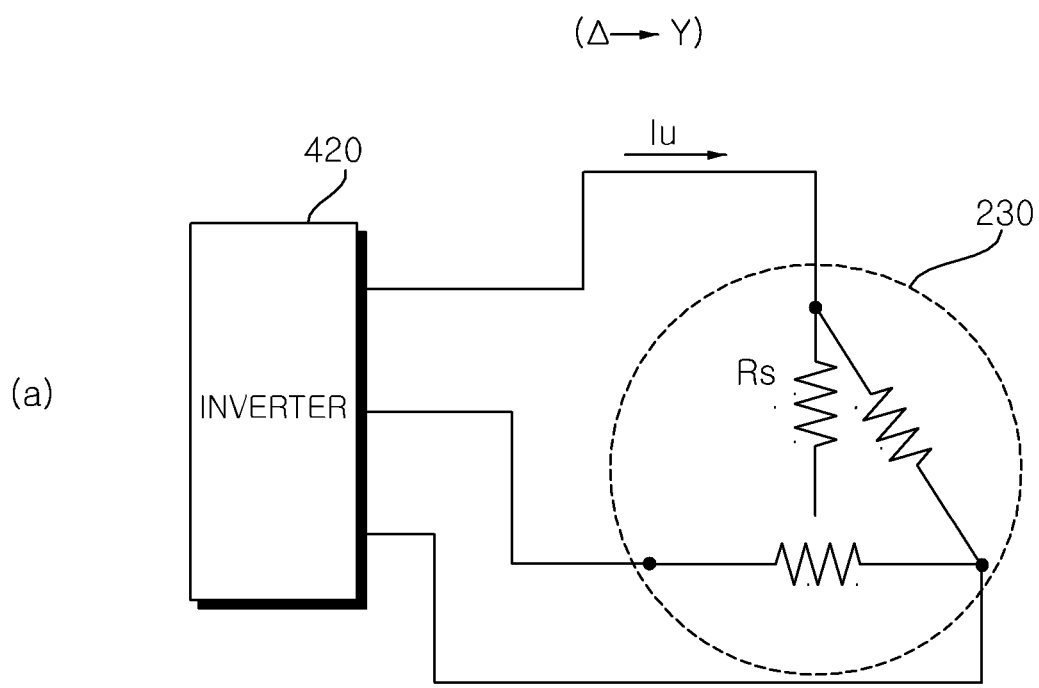
Figure 14C:
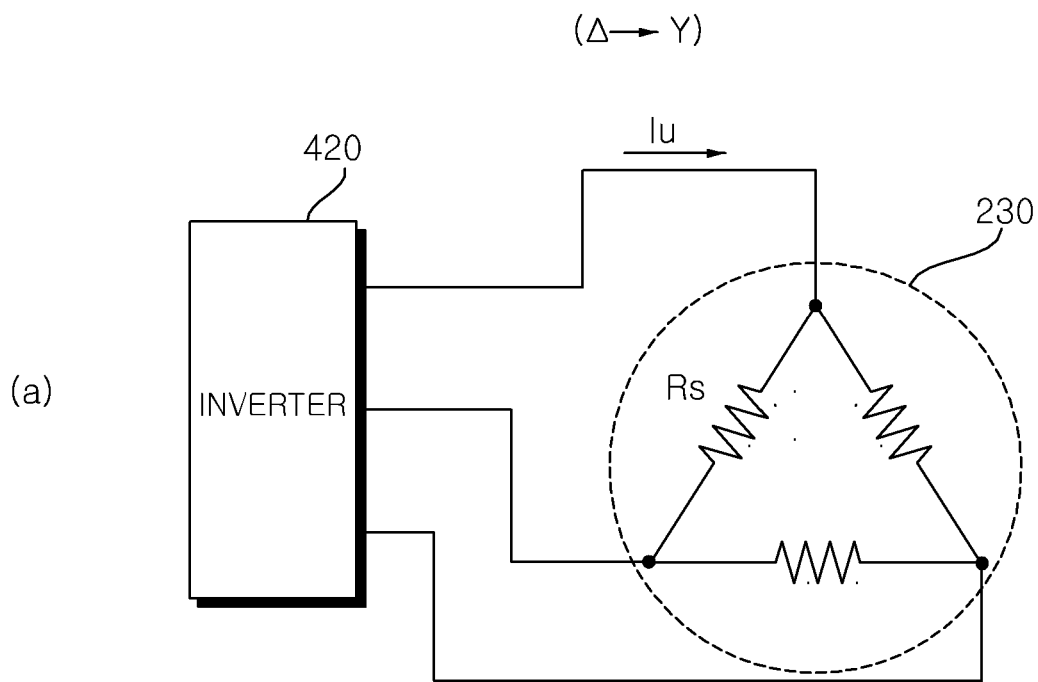

FIGS. 14A to 14C are diagrams illustrating the first winding resistance of each of the U-phase, V-phase, and W-phase, and a ratio therebetween, in the case where the second connection is switched to the first connection.

First, (a) of FIG. 14A illustrates an equivalent circuit diagram of the motor 230 in the case where one relay in the switching device 450 operates abnormally.

Then, (b) of FIG. 14A illustrates the first winding resistance in the case of (a) of FIG. 14A, the second winding resistance of each of the U-phase, V-phase, and W-phase, and a ratio therebetween.

Referring to the drawings, the U-phase winding resistance, the V-phase winding resistance, and the W-phase winding resistance in the first connection may be 1.23Ω, 0.48Ω, and 0.67Ω, respectively.

Meanwhile, the U-phase winding resistance, the V-phase winding resistance, and the W-phase winding resistance in the second connection may be 0.40Ω, 0.40Ω, and 0.40Ω, respectively.

In this regard, a U-phase winding resistance ratio, a V-phase winding resistance ratio, and a W-phase winding resistance ratio, which are winding resistance ratios of the first connection to the second connection may be 3.1, 1.2, and 1.7, respectively.

The winding resistance ratios of the first connection to the second connection fall outside a third range, which is a normal range, for all the three phases, such that the controller 170 or the inverter controller 430 may determine that the operation of the switching device 450 is abnormal.

Meanwhile, all the U-phase winding resistance, the V-phase winding resistance, and the W-phase winding resistance in the first connection fall outside the first range which is a normal range, such that the controller 170 or the inverter controller 430 may determine that the operation of the switching device 450 in the first connection is abnormal.

Meanwhile, all the U-phase winding resistance, the V-phase winding resistance, and the W-phase winding resistance in the second connection are within the second range which is a normal range, such that the controller 170 or the inverter controller 430 may determine that the operation of the switching device 450 in the second connection is normal.

Accordingly, in the case of (a) of FIG. 14A, the controller 170 or the inverter controller 430 may control the switching device 450 to be operated only in the second connection, instead of the first connection.

In FIG. 14B, (a) illustrates an equivalent circuit diagram of the motor 230 in the case where two relays in the switching device 450 operate abnormally.

Then, (b) of FIG. 14B illustrates the first winding resistance in the case of (a) of FIG. 14B, the second winding resistance of each of the U-phase, V-phase, and W-phase, and a ratio therebetween.

Referring to the drawings, the U-phase winding resistance, the V-phase winding resistance, and the W-phase winding resistance in the first connection may be 0.68Ω, 0.68Ω, and 0.41Ω, respectively.

Meanwhile, the U-phase winding resistance, the V-phase winding resistance, and the W-phase winding resistance in the second connection may be 0.4Ω, 0.4Ω, and 0.41Ω, respectively.

In this regard, a U-phase winding resistance ratio, a V-phase winding resistance ratio, and a W-phase winding resistance ratio, which are winding resistance ratios of the first connection to the second connection, may be 1.7, 1.7, and 1.0, respectively.

As the winding resistance ratios of the first connection to the second connection fall outside a third range, which is a normal range, for all the three phases, the controller 170 or the inverter controller 430 may determine that the operation of the switching device 450 is abnormal.

Meanwhile, all the U-phase winding resistance, the V-phase winding resistance, and the W-phase winding resistance in the first connection fall outside the first range which is a normal range, such that the controller 170 or the inverter controller 430 may determine that the operation of the switching device 450 in the first connection is abnormal.

Meanwhile, all the U-phase winding resistance, the V-phase winding resistance, and the W-phase winding resistance in the second connection are within the second range which is a normal range, such that the controller 170 or the inverter controller 430 may determine that the operation of the switching device 450 in the second connection is normal.

Accordingly, in the case of (a) of FIG. 14B, the controller 170 or the inverter controller 430 may control the switching device 450 to be operated only in the second connection, instead of the first connection.

In FIG. 14C, (a) illustrates an equivalent circuit diagram of the motor 230 in the case where three relays in the switching device 450 operate abnormally.

Then, (b) of FIG. 14C illustrates the first winding resistance in the case of (a) of FIG. 14C, the second winding resistance of each of the U-phase, V-phase, and W-phase, and a ratio therebetween.

Referring to the drawings, the U-phase winding resistance, the V-phase winding resistance, and the W-phase winding resistance in the first connection may be 0.39Ω, 0.41Ω, and 0.41Ω, respectively.

Meanwhile, the U-phase winding resistance, the V-phase winding resistance, and the W-phase winding resistance in the second connection may be 0.4Ω, 0.4Ω, and 0.41Ω, respectively.

In this regard, a U-phase winding resistance ratio, a V-phase winding resistance ratio, and a W-phase winding resistance ratio, which are winding resistance ratios of the first connection to the second connection, may be 0.98, 1.0, and 1.0, respectively.

The winding resistance ratios of the first connection to the second connection fall outside a third range, which is a normal range, for all the three phases, such that the controller 170 or the inverter controller 430 may determine that the operation of the switching device 450 is abnormal.

Meanwhile, all the U-phase winding resistance, the V-phase winding resistance, and the W-phase winding resistance in the first connection fall outside the first range which is a normal range, such that the controller 170 or the inverter controller 430 may determine that the operation of the switching device 450 in the first connection is abnormal.

Meanwhile, all the U-phase winding resistance, the V-phase winding resistance, and the W-phase winding resistance in the second connection are within the second range which is a normal range, such that the controller 170 or the inverter controller 430 may determine that the operation of the switching device 450 in the second connection is normal.

Accordingly, in the case of (a) of FIG. 14C, the controller 170 or the inverter controller 430 may control the switching device 450 to be operated only in the second connection, instead of the first connection.

Figure 15:
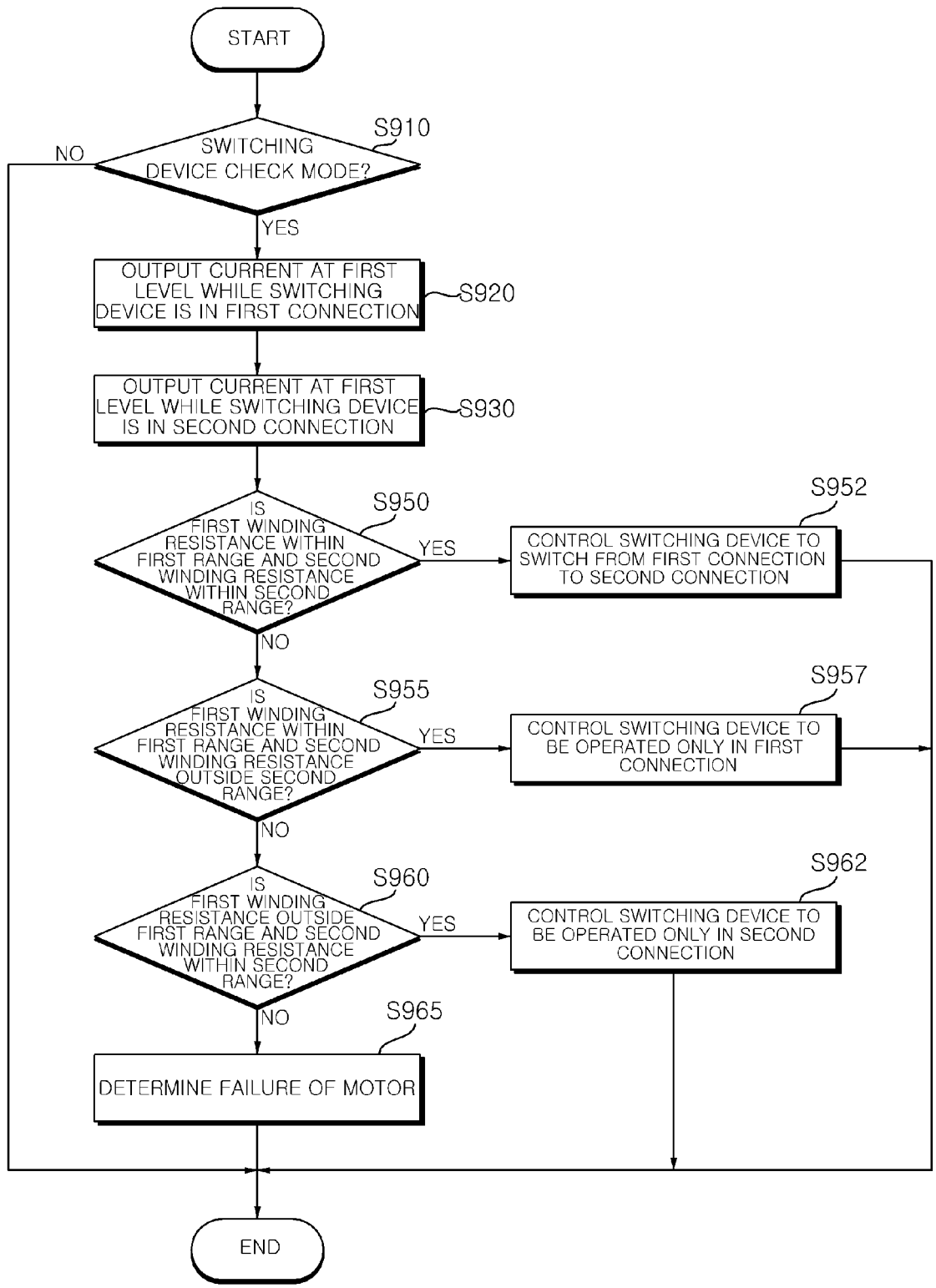
FIG. 15 is a flowchart illustrating an operating method of a motor driving apparatus according to yet another embodiment of the present disclosure.
Figure 16A:
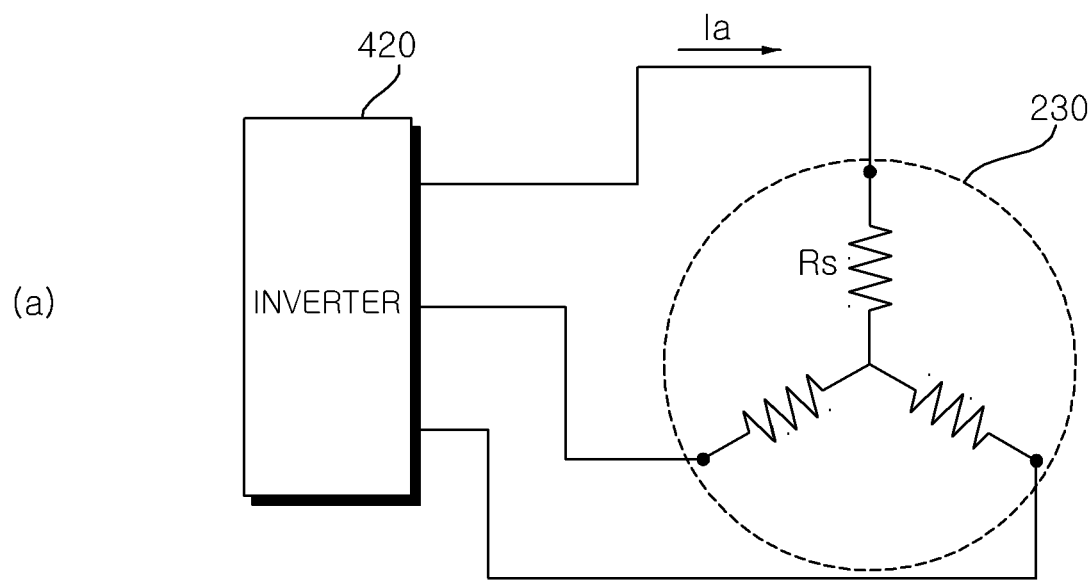
FIGS. 16A to 16C are diagrams referred to in the description of the operation of FIG. 15.
Figure 16A:
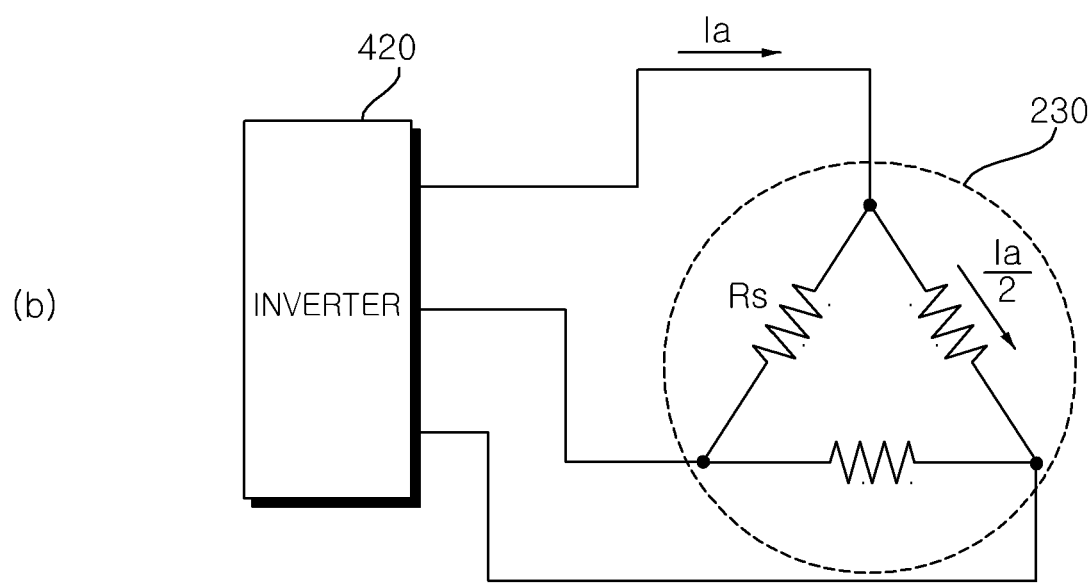
Figure 16B:
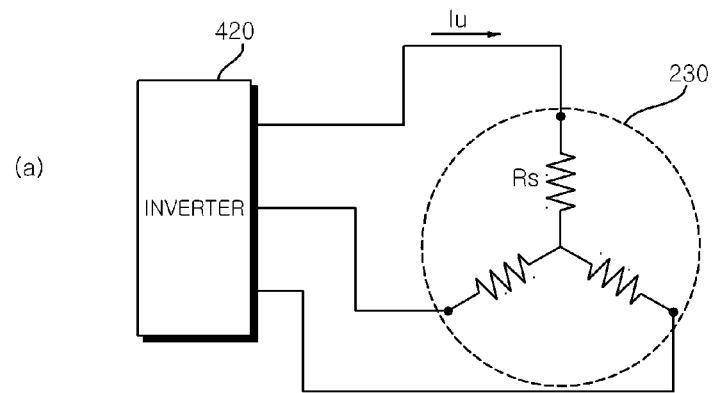
Figure 16B:
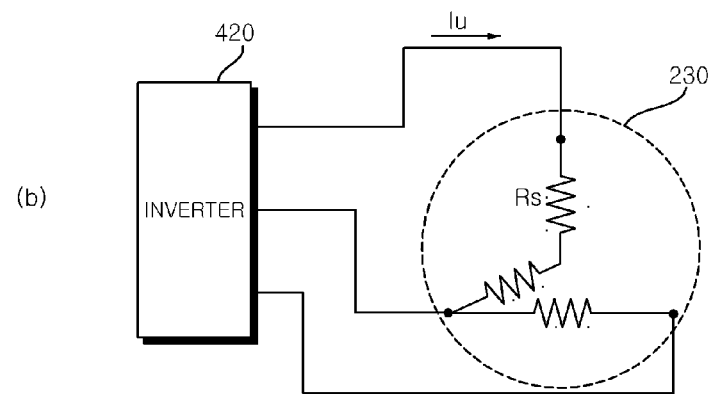
Figure 16B:
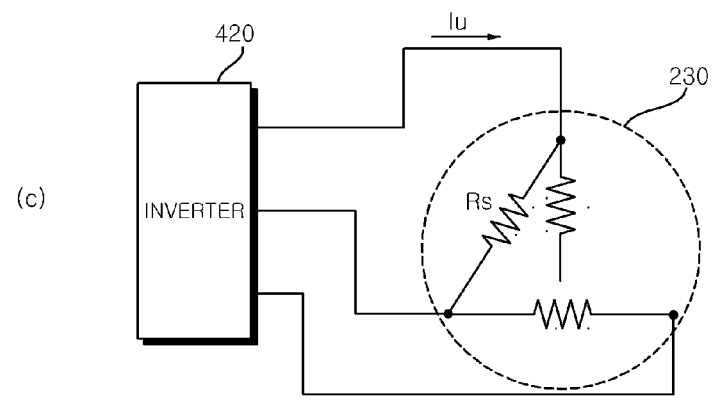
Figure 16C:
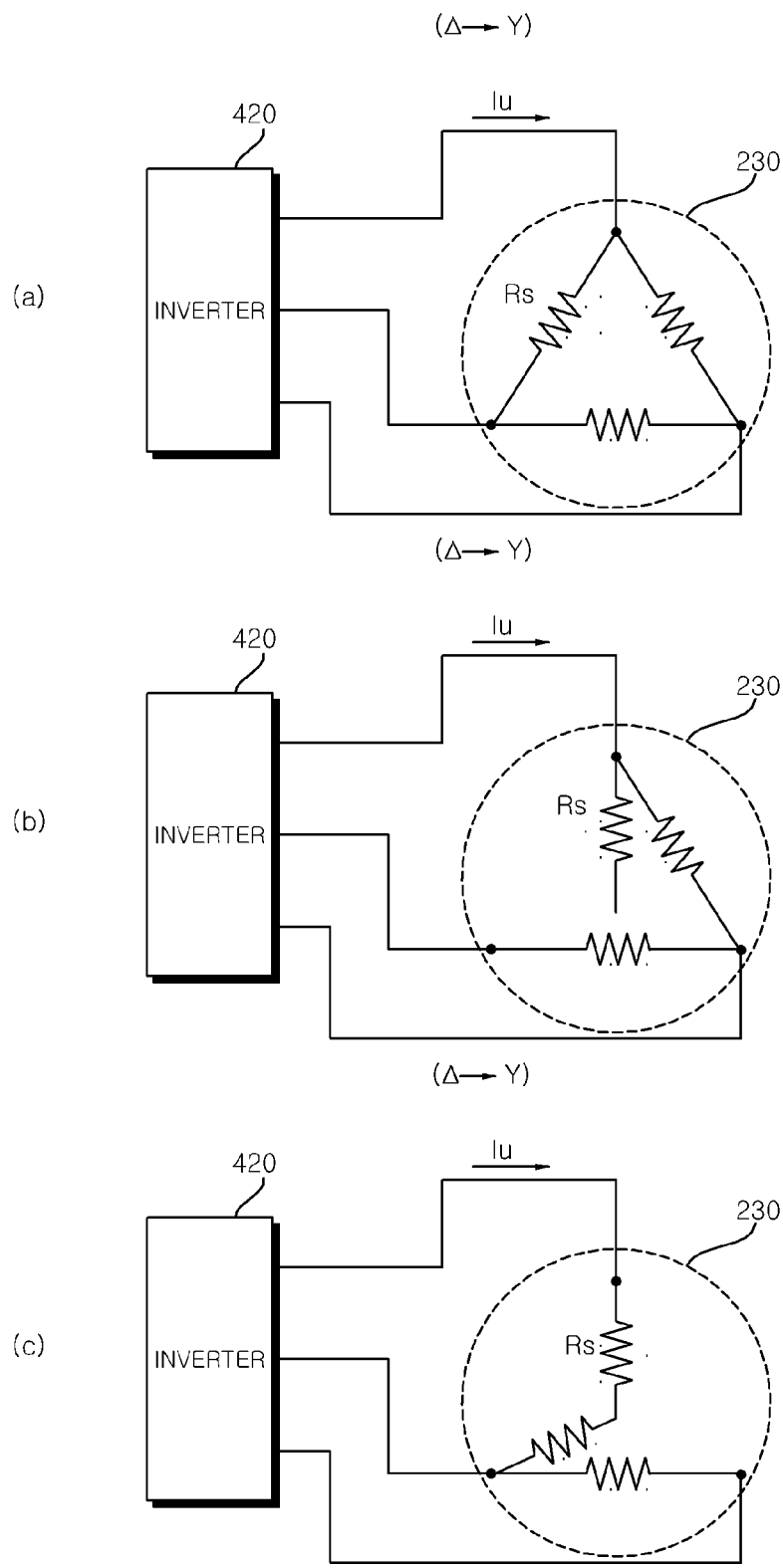

FIG. 15 is a flowchart illustrating an operating method of a motor driving apparatus according to yet another embodiment of the present disclosure; and FIGS. 16A to 16C are diagrams referred to in the description of the operation of FIG. 15.

Referring to FIG. 15, the operating method of FIG. 15 is similar to the operating method of FIG. 9A, but there is a difference in that operations 950 (S950) to 965 (S965) are further performed after the operation 930 (S930).

Accordingly, the operations 910 (S910), 920 (S920), and 930 (S930) will be described with reference to the above description of FIG. 9A.

While only the operations 910 (S910), 920 (S920), and 930 (S930) are illustrated herein, the present disclosure is not limited thereto, and an operation 950 (S950) may also be performed after the operations 910 (S910), 920 (S920), 922 (S922), 930 (S930), and 932 (S932) are performed.

Meanwhile, the controller 170 or the inverter controller 430 calculates the first winding resistance in the first connection and the second winding resistance in the second connection. Particularly, the controller 170 or the inverter controller 430 may calculate the first winding resistance in the first connection and the second winding resistance in the second connection for each of the U, V, and W phases.

Then, the controller 170 or the inverter controller 430 may determine whether the first winding resistance is within a first range and the second winding resistance is within a second range (S950).

As described above, the first range may be in a range of 0.7 to 1.2, and the second range may be in a range of 0.3 to 0.6.

Subsequently, if the first winding resistance is within the first range, and the second winding resistance is within the second range, the controller 170 or the inverter controller 430 may control the switching device 450 to switch the windings of the motor 230 from the first connection to the second connection according to an operating frequency of the motor 230 (S952).

Accordingly, when the switching device 450 operates normally, the power conversion efficiency or driving efficiency of the motor 230 may be increased.

Meanwhile, while the switching device 450 switches the windings of the motor 230 from the first connection to the second connection, the controller 170 or the inverter controller 430 may control the motor 230 to continue to operate without stopping. Accordingly, as the motor 230 does not stop during the switching operation of the switching device 450, the operating efficiency of the motor 230 may be improved.

Meanwhile, while the switching device 450 switches the windings of the motor 230 from the first connection to the second connection, the controller 170 or the inverter controller 430 may control an operating frequency of the motor 230 to decrease from a first frequency to a second frequency and then to increase again. Accordingly, as the motor 230 does not stop during the switching operation of the switching device 450, the operating efficiency of the motor 230 may be improved.

Meanwhile, if the operation 950 (S950) is not satisfied, the controller 170 or the inverter controller 430 determines whether the first winding resistance is within a first range and the second winding resistance falls outside a second range (S955).

Further, if the first winding resistance is within the first range, and the second winding resistance falls outside the second range, the controller 170 or the inverter controller 430 may control the switching device 450 to be operated only in the first connection and not to be operated in the second connection (S957). As described above, by controlling the switching device 450 to be operated only in any one connection when the switching device 450 operates abnormally, an emergency operation of the motor 230 may be performed.

Meanwhile, if the operation 955 (S955) is not satisfied, the controller 170 or the inverter controller 430 determines whether the first winding resistance falls outside the first range, and the second winding resistance is within the second range (S960).

Further, if the first winding resistance falls outside the first range, and the second winding resistance is within the second range, the controller 170 or the inverter controller 430 may control the switching device 450 to be operated only in the second connection and not to be operated in the first connection (S957). As described above, by controlling the switching device 450 to be operated only in any one connection when the switching device 450 operates abnormally, an emergency operation of the motor 230 may be performed.

Meanwhile, if the operation 960 (S960) is not satisfied, the controller 170 or the inverter controller 430 may determine that the first winding resistance falls outside the first range, and the second winding resistance falls outside the second range and may determine that the motor 230 is out of order (S965), thereby simply determining whether a failure occurs in the motor 230.

In addition, when the motor 230 is out of order, the controller 170 or the inverter controller 430 may stop the operation of the motor 230 as well as the operation of the inverter 420 and the like, thereby preventing damage to a circuit element in the motor driving apparatus 220 and the like.

FIG. 16A illustrates various examples of an equivalent circuit diagram of the motor 230 in the case where the first winding resistance is within the first range, and the second winding resistance is within the second range.

In FIG. 16A, (a) illustrates an equivalent circuit diagram of the motor 230 in the first connection which is Y-connection; and (b) illustrates an equivalent circuit diagram of the motor 230 in the second connection which is Δ-connection.

As in the operation 952 (S952) of FIG. 15, the controller 170 or the inverter controller 430 may control a switching operation between the first connection and the second connection according to an operating frequency of the motor 230.

FIG. 16B illustrates various examples of an equivalent circuit diagram of the motor 230 in the case where the first winding resistance is within the first range, and the second winding resistance falls outside the second range.

In FIG. 16B, (a) corresponds to a case where there is an abnormality in three relays as illustrated in FIG. 13C; (b) corresponds to a case where there is an abnormality in two relays as illustrated in FIG. 13B; and (c) corresponds to a case where there is an abnormality in one relay as illustrated in FIG. 13A.

Accordingly, in the case of FIG. 16B, the controller 170 or the inverter controller 430 may control the switching device 450 to be operated only in the first connection and not to be operated in the second connection.

FIG. 16C illustrates various examples of an equivalent circuit diagram of the motor 230 in the case where the first winding resistance falls outside the first range, and the second winding resistance is within the second range.

In FIG. 16C, (a) corresponds to a case where there is an abnormality in three relays as illustrated in FIG. 13C; (b) corresponds to a case where there is an abnormality in two relays as illustrated in FIG. 13B; and (c) corresponds to a case where there is an abnormality in one relay as illustrated in FIG. 13A.

Accordingly, in the case of FIG. 16C, the controller 170 or the inverter controller 430 may control the switching device 450 to be operated only in the second connection and not to be operated in the first connection.

Meanwhile, the motor driving apparatus 220 according to the embodiments of the present disclosure, which are described above with reference to FIGS. 4 to 16C, may be applied to various home appliances in addition to the air conditioner 100 of FIG. 1. For example, the motor driving apparatus 220 may be applied in various fields, such as a laundry treatment apparatus (washing machine, dryer, etc.), a refrigerator, a water purifier, a robot cleaner, a robot, a vehicle, a drone, and the like.

The motor driving apparatus and an air conditioner including the same according to an embodiment of the present disclosure may include a switching device disposed between an inverter and a motor, in which in a switching device check mode, an output current at a first level is output from the inverter during a first period in a state in which the windings of the motor are connected in the first connection by an operation of the switching device, and the output current at the first level is output from the inverter during a second period after the first period in a state in which the windings of the motor are connected in the second connection by the operation of the switching device. Accordingly, it is possible to determine whether the switching device for switching connection of the motor operates abnormally.

Meanwhile, based on a winding resistance of the motor in the first connection and a winding resistance of the motor in the second connection, the controller may determine whether the switching device operates abnormally, thereby simply determining an abnormal operation of the switching device based on the winding resistance in the first connection and the winding resistance in the second connection by the operation of the switching device.

Meanwhile, the motor driving apparatus and the air conditioner including the same may further include an output voltage detector configured to detect an output voltage output from the inverter, wherein the controller may calculate a first winding resistance of the motor based on a first output voltage detected according to an output of the output current at the first level during the first period; may calculate a second winding resistance of the motor based on a second output voltage detected according to the output of the output current at the first level during the second period; and may determine whether the switching device operates abnormally based on the first winding resistance and the second winding resistance, thereby simply determining an abnormal operation of the switching device for switching connection of the motor.

Meanwhile, the controller may calculate a ratio between the first winding resistance and the second winding resistance and may determine whether the switching device operates abnormally based on the calculated ratio, thereby simply determining an abnormal operation of the switching device for switching connection of the motor.

Meanwhile, the controller may calculate ratios between the first winding resistance and the second winding resistance for each phase; and in response to ratios of all phases among the calculated ratios being within a predetermined range, the controller may determine that the switching device is normal, and may control the switching device to switch the windings of the motor from the first connection to the second connection according to an operating frequency of the motor, thereby increasing the power conversion efficiency or motor driving efficiency when the switching device operates normally.

Meanwhile, the controller may control the motor to continue to operate without stopping while the switching device switches the windings of the motor from the first connection to the second connection. Accordingly, the motor does not stop operating when the switching device performs a switching operation, such that the operating efficiency of the motor may be improved.

Meanwhile, the controller may control the operating frequency of the motor to decrease from a first frequency to a second frequency and then to increase again, while the switching device switches the windings of the motor from the first connection to the second connection. Accordingly, the motor does not stop operating when the switching device performs a switching operation, such that the operating efficiency of the motor may be improved.

Meanwhile, the controller may calculate ratios between the first winding resistance and the second winding resistance for each phase; and in response to a ratio of at least one phase among the calculated ratios falling outside a predetermined range, the controller may determine that the switching device is abnormal, and may control the windings of the motor to be operated in either the first connection or the second connection. Accordingly, when the switching device is abnormal, the motor may be operated only in any one connection, such that an emergency operation of the motor may be performed.

Meanwhile, the controller may calculate the first winding resistance and the second winding resistance for each phase; and in response to a range of the first winding resistance for each phase falling outside a first range, and a range of the second winding resistance for each phase falling outside a second range, the controller may determine that the motor is out of order, thereby simply determining a failure of the motor.

Meanwhile, the controller may calculate the first winding resistance and the second winding resistance for each phase; and in response to a range of the first winding resistance for each phase being within the first range, and a range of the second winding resistance for each phase being within the second range, the controller may determine that the switching device is normal, and may control the switching device to switch the windings of the motor from the first connection to the second connection according to an operating frequency of the motor. Accordingly, when the switching device operates normally, the power conversion efficiency or motor driving efficiency may be increased.

Meanwhile, the controller may calculate the first winding resistance and the second winding resistance for each phase; and in response to a range of the first winding resistance for each phase being within the first range, and a range of the second winding resistance for each phase falling outside the second range, the controller may determine that the switching device is abnormal, and may control the windings of the motor to be operated only in the first connection. Accordingly, by controlling the windings of the motor to be operated only in any one connection when the switching device is abnormal, an emergency operation of the motor may be performed.

Meanwhile, the controller may calculate the first winding resistance and the second winding resistance for each phase; and in response to a range of the first winding resistance for each phase falling outside the first range, and a range of the second winding resistance for each phase being within the second range, the controller may determine that the switching device is abnormal, and may control the windings of the motor to be operated only in the second connection. Accordingly, by controlling the windings of the motor to be operated only in any one connection when the switching device is abnormal, an emergency operation of the motor may be performed.

Meanwhile, the controller may control the output current at the first level and the output current at the second level to be sequentially output from the inverter during the first period in a state in which the windings of the motor are connected in the first connection; and may control the output current at the first level and the output current at the second level to be sequentially output from the inverter during the second period in a state in which the windings of the motor are connected in the second connection. Accordingly, as output currents at various levels may be output, accuracy in determining an abnormal operation of the switching device for switching connection of the motor may be improved.

Meanwhile, the motor driving apparatus and the air conditioner including the same may further include an output voltage detector configured to detect an output voltage output from the inverter, wherein the controller may calculate a first winding resistance of the motor based on an output voltage detected according to the output of the output current at the first level and the output current at the second level during the first period; may calculate a second winding resistance of the motor based on a second output voltage detected according to the output of the output current at the first level and the output current at the second level during the second period; and may determine whether the switching device operates abnormally based on the first winding resistance and the second winding resistance, thereby simply determining an abnormal operation of the switching device based on the winding resistance in the first connection and the winding resistance in the second connection by the operation of the switching device.

Meanwhile, the motor may be a three-phase motor; and the switching device may include a first to third relays which are electrically connected to each phase output of the inverter, wherein: a first terminal of the first relay, a first terminal of the second relay, and a first terminal of the third relay may be connected in parallel; one end of a first winding of the motor may be connected to a second terminal of the first relay; one end of a second winding of the motor may be connected to a second terminal of the second relay; one end of a third winding of the motor may be connected to a second terminal of the third relay; an opposite end of the first winding of the motor may be connected to a common terminal of the third relay; an opposite end of the second winding of the motor may be connected to a common terminal of the first relay; and an opposite end of the third winding of the motor may be connected to a common terminal of the second relay. Accordingly, it is possible to control the motor to be operated in either the first connection or the second connection by the switching device, such that the power conversion efficiency or motor driving efficiency may be increased.

Meanwhile, for the first connection, the controller may control the common terminals of the first to third relays to be electrically connected to the respective first terminals of the first to third relays; and for the second connection, the controller may control the common terminals of the first to third relays to be electrically connected to the respective second terminals of the first to third relays. Accordingly, it is possible to control the motor to be operated in either the first connection or the second connection by the switching device, such that the power conversion efficiency or motor driving efficiency may be increased.

In accordance with another aspect of the present disclosure, the above and other objects can be accomplished by providing a motor driving apparatus and an air conditioner including the same, which include: an inverter having a plurality of switching elements, and configured to output alternating current (AC) power to a motor based on a switching operation; a switching device disposed between the inverter and the motor, and configured to switch windings of the motor to a first connection or a second connection; an output current detector configured to detect an output current output from the inverter; and a controller configured to control the inverter and the switching device, wherein based on a first winding resistance of the motor in the first connection and a second winding resistance of the motor in the second connection, the controller determines whether the switching device operates abnormally, thereby simply determining an abnormal operation of the switching device based on the winding resistance in the first connection and the winding resistance in the second connection by the operation of the switching device.

Meanwhile, the controller may calculate the first winding resistance and the second winding resistance for each phase, wherein: in response to a range of the first winding resistance for each phase falling outside a first range, and a range of the second winding resistance for each phase falling outside a second range, the controller may determine that the motor is out of order: and in response to a range of the first winding resistance for each phase being within the first range, and a range of the second winding resistance for each phase being within the second range, the controller may determine that the switching device is normal, and may control the switching device to switch the windings of the motor from the first connection to the second connection according to an operating frequency of the motor. Accordingly, it is possible to simply determine a failure of the motor or a normal operation of the switching device.

Meanwhile, the controller may calculate the first winding resistance and the second winding resistance for each phase, wherein: in response to a range of the first winding resistance for each phase being within a first range, and a range of the second winding resistance for each phase falling outside a second range, the controller may determine that the switching device is abnormal and may control the windings of the motor to be operated only in the first connection: and in response to a range of the first winding resistance for each phase falling outside the first range, and a range of the second winding resistance for each phase being within the second range, the controller may determine that the switching device is abnormal, and may control the windings of the motor to be operated only in the second connection. Accordingly, by controlling the windings of the motor to be operated only in any one connection, an emergency operation of the motor may be performed.

Meanwhile, an operating method of the motor driving apparatus or the air conditioner according to the present disclosure can be realized as a processor-readable code written on a recording medium readable by a processor included in the motor driving apparatus or the air conditioner. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A motor driving apparatus, comprising:
    an inverter that includes a plurality of switching elements, and is configured to output alternating current (AC) power to a motor based on a switching operation;
    a switching device disposed between the inverter and the motor, and configured to switch windings of the motor to a first connection or a second connection;
    an output current detector configured to detect an output current from the inverter;
    an output voltage detector configured to detect an output voltage from the inverter; and
    a controller configured to control the inverter and the switching device,
    wherein the controller is configured to: based on being in a switching device check mode,
    (i) sequentially output an output current at a first level and a second level greater than the first level during a first period in which the switching device connects the windings of the motor to the first connection,
    (ii) sequentially output the output current at the first level and the second level during a second period after the first period in which the switching device connects the windings of the motor to the second connection, and
    (iii) sequentially output an output current at a third level lower than the first level during a third period between the first period and the second period,
    wherein the controller is configured to control an operating frequency of the motor to decrease from a first frequency to a second frequency and then to increase again, without stopping the motor during the third period in which the switching device switches the windings of the motor from the first connection to the second connection.

2. The apparatus of claim 1, wherein the controller is configured to, based on a winding resistance of the motor in the first connection and a winding resistance of the motor in the second connection, determine whether the switching device operates abnormally.

3. The apparatus of claim 1,
    wherein the controller is configured to:
    calculate a first winding resistance of the motor based on a first output voltage detected according to the output current at the first level during the first period,
    calculate a second winding resistance of the motor based on a second output voltage detected according to the output current at the first level during the second period, and
    determine whether the switching device operates abnormally based on the first winding resistance and the second winding resistance.

4. The apparatus of claim 3, wherein the controller is configured to calculate a ratio between the first winding resistance and the second winding resistance and determine whether the switching device operates abnormally based on the calculated ratio.

5. The apparatus of claim 3, wherein the controller is configured to:
calculate a ratio between the first winding resistance and the second winding resistance for each phase of the motor,
based on the calculated ratio for all periods being within a predetermined range, determine that the switching device is normal, and
control the switching device to switch the windings of the motor from the first connection to the second connection according to the operating frequency of the motor.

6. The apparatus of claim 3, wherein the controller is configured to:
calculate a ratio between the first winding resistance and the second winding resistance for each phase of the motor,
based on a ratio of at least one phase among the calculated ratios falling outside a predetermined range, determine that the switching device is operating abnormally, and
control the windings of the motor to be operated in either the first connection or the second connection.

7. The apparatus of claim 3, wherein the controller is configured to:
calculate the first winding resistance and the second winding resistance for each phase of the motor, and
based on the first winding resistance for each phase of the motor falling outside a first range, and the second winding resistance for each phase of the motor falling outside a second range, determine a failure of the motor.

8. The apparatus of claim 7, wherein the controller is configured to:
calculate the first winding resistance and the second winding resistance for each phase of the motor,
based on the first winding resistance for each phase of the motor being within the first range, and the second winding resistance for each phase of the motor being within the second range, determine that the switching device is operating normally, and
control the switching device to switch the windings of the motor from the first connection to the second connection according to an operating frequency of the motor.

9. The apparatus of claim 7, wherein the controller is configured to:
calculate the first winding resistance and the second winding resistance for each phase of the motor,
based on the first winding resistance for each phase of the motor being within the first range, and the second winding resistance for each phase of the motor falling outside the second range, determine that the switching device is operating abnormally, and
control the windings of the motor to be operated only in the first connection.

10. The apparatus of claim 7, wherein the controller is configured to:
calculate the first winding resistance and the second winding resistance for each phase of the motor,
based on the first winding resistance for each phase of the motor falling outside the first range, and the second winding resistance for each phase of the motor being within the second range, determine that the switching device is operating abnormally, and
control the windings of the motor to be operated only in the second connection.

11. The apparatus of claim 1,
wherein the controller is configured to:
calculate a first winding resistance of the motor based on a first output voltage detected according to the output current at the first level and the output current at the second level during the first period,
calculate a second winding resistance of the motor based on a second output voltage detected according to the output current at the first level and the output current at the second level during the second period, and
determine whether the switching device operates abnormally based on the first winding resistance and the second winding resistance.

12. The apparatus of claim 1, wherein the motor is a three-phase motor, and the switching device comprises a first to third relays which are connected to each phase of the motor output of the inverter, and
wherein:
a first terminal of the first relay, a first terminal of the second relay, and a first terminal of the third relay are connected in parallel,
one end of a first winding of the motor is connected to a second terminal of the first relay,
one end of a second winding of the motor is connected to a second terminal of the second relay,
one end of a third winding of the motor is connected to a second terminal of the third relay,
an opposite end of the first winding of the motor is connected to a common terminal of the third relay,
an opposite end of the second winding of the motor is connected to a common terminal of the first relay, and
an opposite end of the third winding of the motor is connected to a common terminal of the second relay.

13. The apparatus of claim 12, wherein the controller is configured to:
based on the windings of the motor being operated in the first connection, control the common terminals of the first to third relays to be connected to the respective first terminals of the first to third relays, and
based on the windings of the motor being operated in the second connection, control the common terminals of the first to third relays to be connected to the respective second terminals of the first to third relays.

14. A motor driving apparatus, comprising:
an inverter that includes a plurality of switching elements, and is configured to output alternating current (AC) power to a motor based on a switching operation;
a switching device disposed between the inverter and the motor, and configured to switch windings of the motor to a first connection or a second connection;
an output current detector configured to detect an output current from the inverter; and
a controller configured to control the inverter and the switching device,
wherein the controller is configured to, based on a first winding resistance of the motor in the first connection and a second winding resistance of the motor in the second connection, determine whether the switching device operates abnormally, and
wherein the controller is configured to:
calculate the first winding resistance and the second winding resistance,
based on (i) the first winding resistance being within a first range and (ii) the second winding resistance falling outside a second range, determine that the switching device is operating abnormally and control the windings of the motor to be operated only in the first connection, and based on (i) the first winding resistance falling outside the first range and (ii) the second winding resistance being within the second range, determine that the switching device is operating abnormally and control the windings of the motor to be operated only in the second connection.

15. The motor driving apparatus of claim 14, wherein the controller is configured to:

based on the first winding resistance falling outside the first range, and the second winding resistance falling outside the second range, determine that the switching device is operating abnormally, based on the first winding resistance being within the first range, and the second winding resistance being within the second range, determine that the switching device is operating normally, and control the switching device to switch the windings of the motor from the first connection to the second connection according to an operating frequency of the motor.

16. An air conditioner, comprising:

a compressor motor; and a motor driving apparatus configured to drive the compressor motor, wherein the motor driving apparatus comprises:

an inverter that includes a plurality of switching elements, and is configured to output alternating current (AC) power to a motor based on a switching operation, a switching device disposed between the inverter and the motor, and configured to switch windings of the motor to a first connection or a second connection, an output current detector configured to detect an output current from the inverter, an output voltage detector configured to detect an output voltage from the inverter, a controller configured to control the inverter and the switching device, and wherein the controller is configured to: based on being in a switching device check mode, (i) sequentially output an output current at a first level and a second level greater than the first level during a first period in which the switching device connects the windings of the motor to the first connection, (ii) sequentially output the output current at the first level and the second level during a second period after the first period in which the switching device connects the windings of the motor to the second connection, and (iii) sequentially output an output current at a third level lower than the first level during a third period between the first period and the second period, wherein the controller is configured to control an operating frequency of the motor to decrease from a first frequency to a second frequency and then to increase again, without stopping the motor during the third period in which the switching device switches the windings of the motor from the first connection to the second connection.

* * * * *